(12) United States Patent
Edmonds et al.

(10) Patent No.: US 12,446,549 B1
(45) Date of Patent: Oct. 21, 2025

(54) ANIMAL TRAINING BUMPER

(71) Applicant: Edmonds Outdoors, LLC, La Vergne, TN (US)

(72) Inventors: Addison Edmonds, Nashville, TN (US); Gene Andrew Sparks, Nashville, TN (US); Colton Gray Breeding, Nashville, TN (US)

(73) Assignee: Edmonds Outdoors, LLC, La Vergne, TN (US)

( * ) Notice: Subject to any disclaimer, the term of this patent is extended or adjusted under 35 U.S.C. 154(b) by 21 days.

(21) Appl. No.: 18/636,407

(22) Filed: Apr. 16, 2024

Related U.S. Application Data

(60) Provisional application No. 63/459,655, filed on Apr. 16, 2023.

(51) Int. Cl.
*A01K 15/02* (2006.01)

(52) U.S. Cl.
CPC .................... *A01K 15/025* (2013.01)

(58) Field of Classification Search
CPC .............................. A01K 15/02; A01K 15/025
See application file for complete search history.

(56) References Cited

U.S. PATENT DOCUMENTS

| | | | | |
|---|---|---|---|---|
| 2,353,479 | A * | 7/1944 | Lock | F16G 15/08 |
| | | | | 254/335 |
| 3,830,202 | A * | 8/1974 | Garrison | A01K 15/025 |
| | | | | D30/160 |
| 5,111,771 | A * | 5/1992 | Mathews | A01K 15/025 |
| | | | | 119/708 |
| 5,706,762 | A * | 1/1998 | Dokken | A01K 15/02 |
| | | | | 119/707 |
| 5,904,118 | A * | 5/1999 | Markham | A01K 15/025 |
| | | | | 119/707 |
| 8,322,308 | B2 * | 12/2012 | Curry | A01K 15/025 |
| | | | | 119/702 |
| 8,875,662 | B2 | 11/2014 | Angle et al. | |
| 8,985,060 | B2 | 3/2015 | Angle et al. | |
| 2009/0101078 | A1 * | 4/2009 | Dobihal | A01K 15/025 |
| | | | | 119/707 |
| 2010/0216608 | A1 * | 8/2010 | Veitch | A63B 5/20 |
| | | | | 482/82 |
| 2016/0280433 | A1 * | 9/2016 | Montejo | B65D 63/12 |

* cited by examiner

*Primary Examiner* — Kimberly S Berona
*Assistant Examiner* — Katherine June Walter
(74) *Attorney, Agent, or Firm* — Holland & Knight LLP; Matthew C. Cox; Forrest S. Tinnin

(57) ABSTRACT

An animal training bumper apparatus is provided. The apparatus may include a body with an axial passage extending between a first opening on a first end of the body and a second opening on a second end of the body opposite the first end. The axial passage may define a first passage on the first side of the body and a second passage on the second side of the body. The apparatus may further include a sleeve disposed in the second passage and a handle disposed on the sleeve. The first passage may have a first passage diameter, and the second passage may have a second passage diameter that is greater than the first passage diameter. The sleeve may have an outer sleeve diameter that is greater than the first passage diameter.

6 Claims, 33 Drawing Sheets

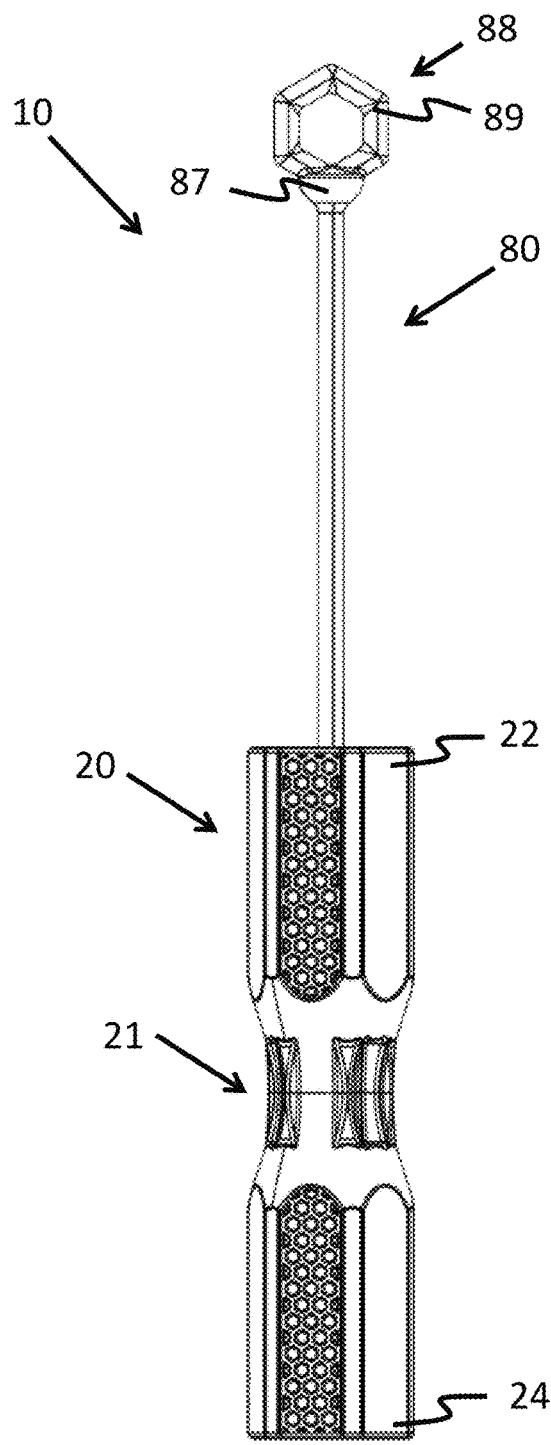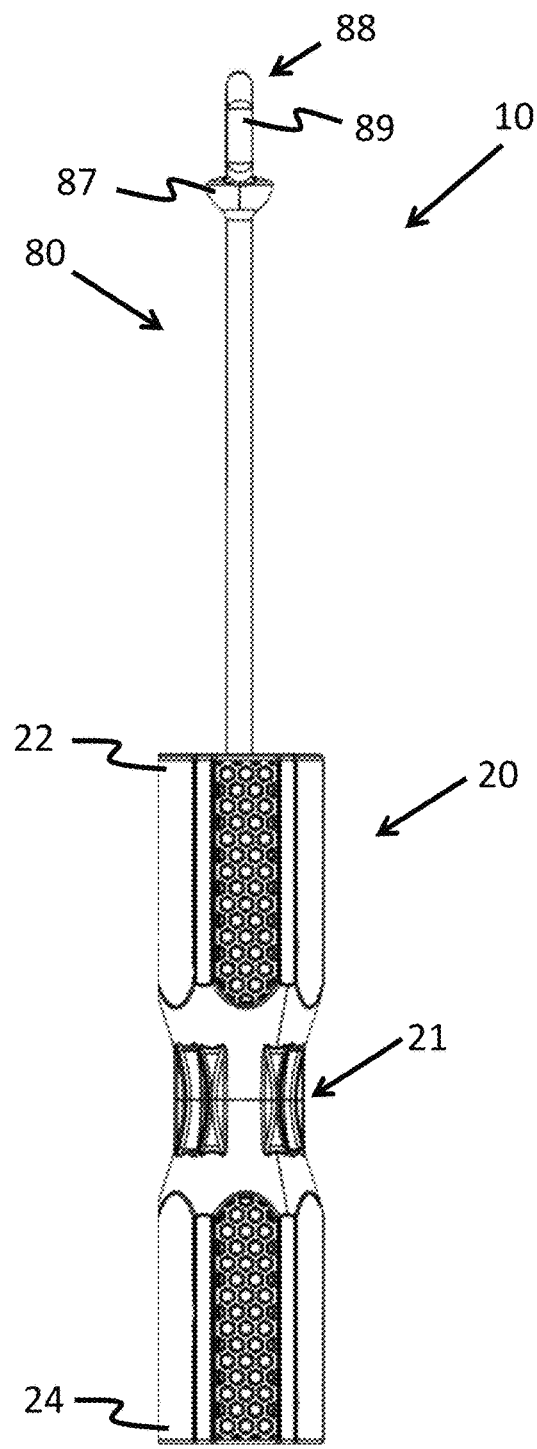
FIG. 1B  FIG. 1C

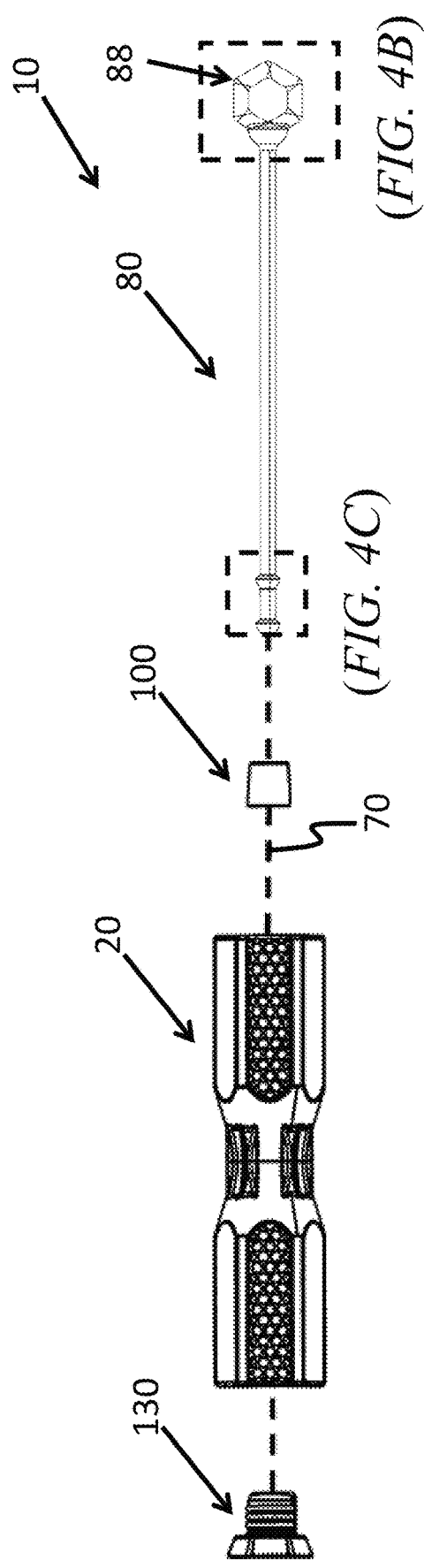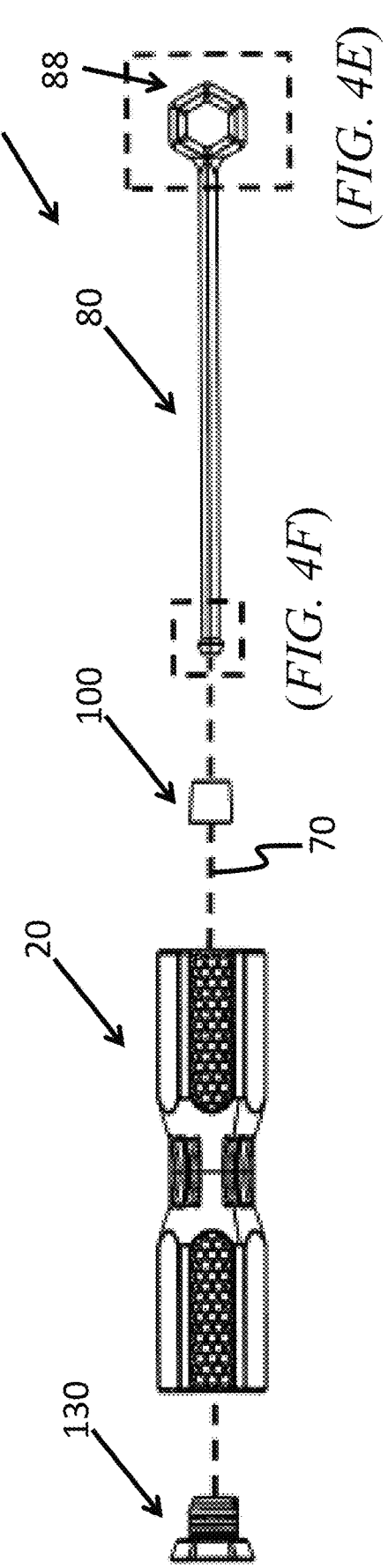

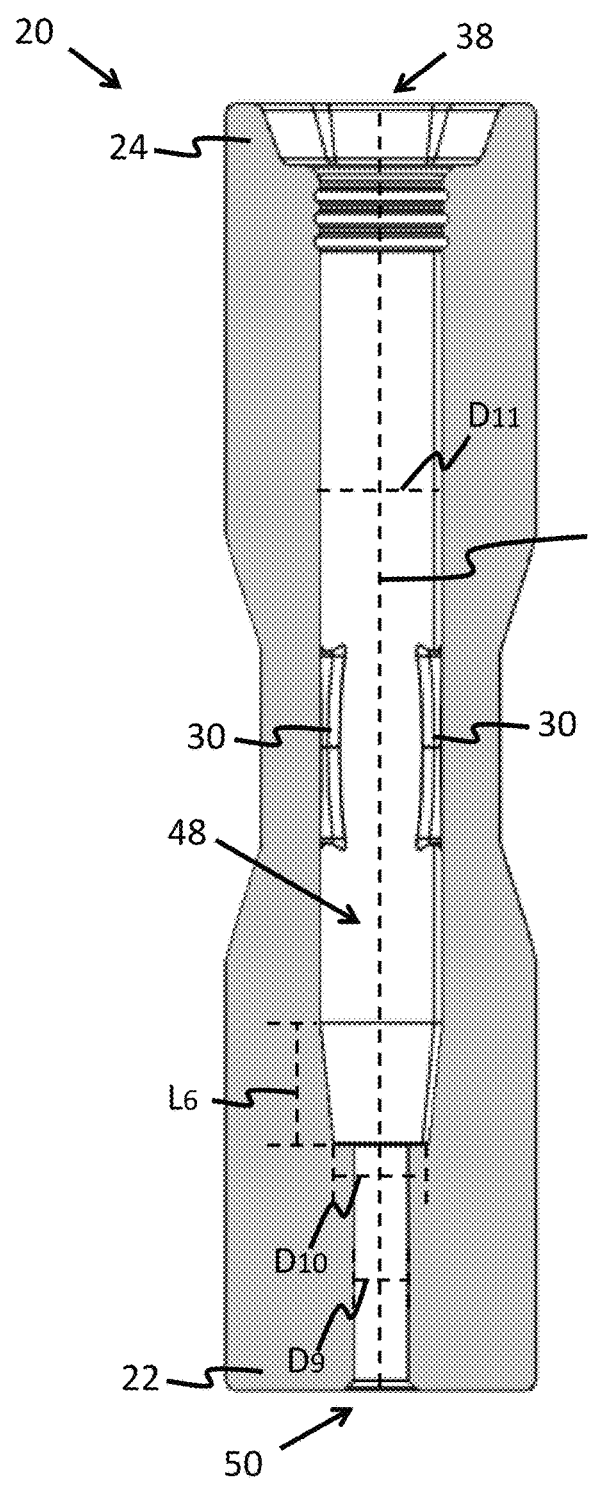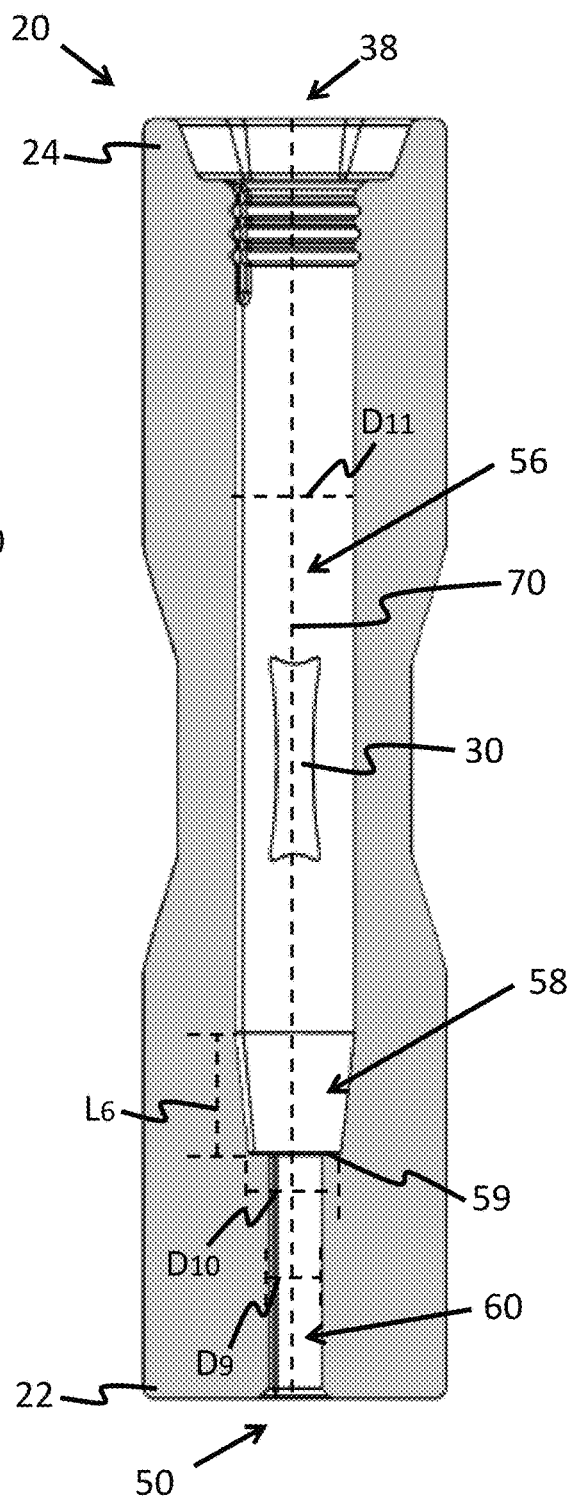
FIG. 9C  FIG. 9D

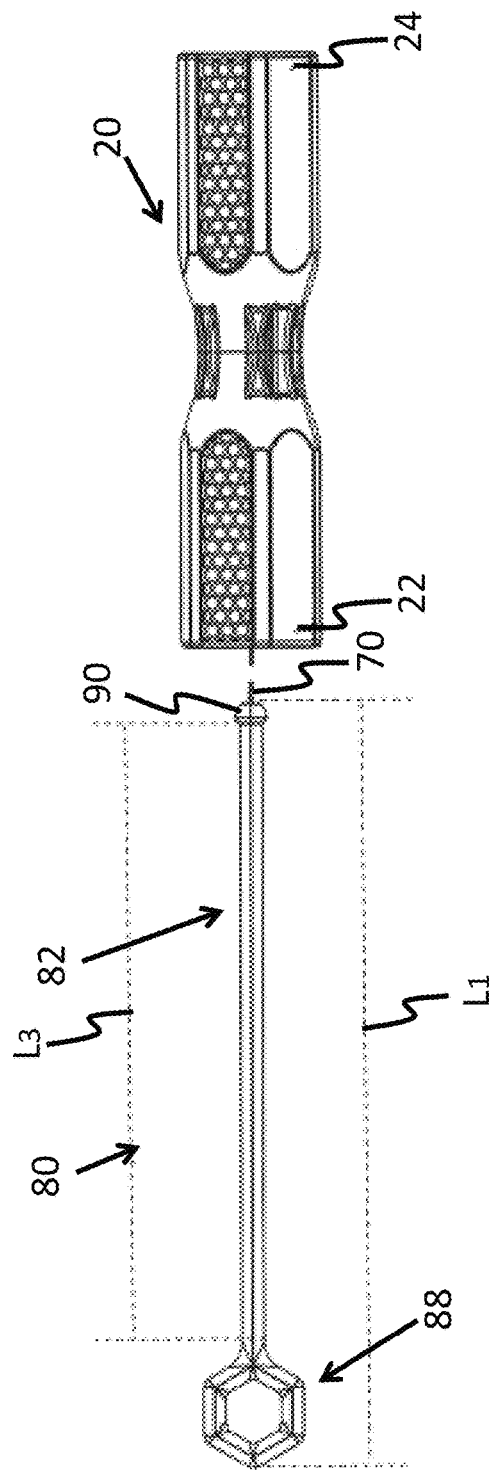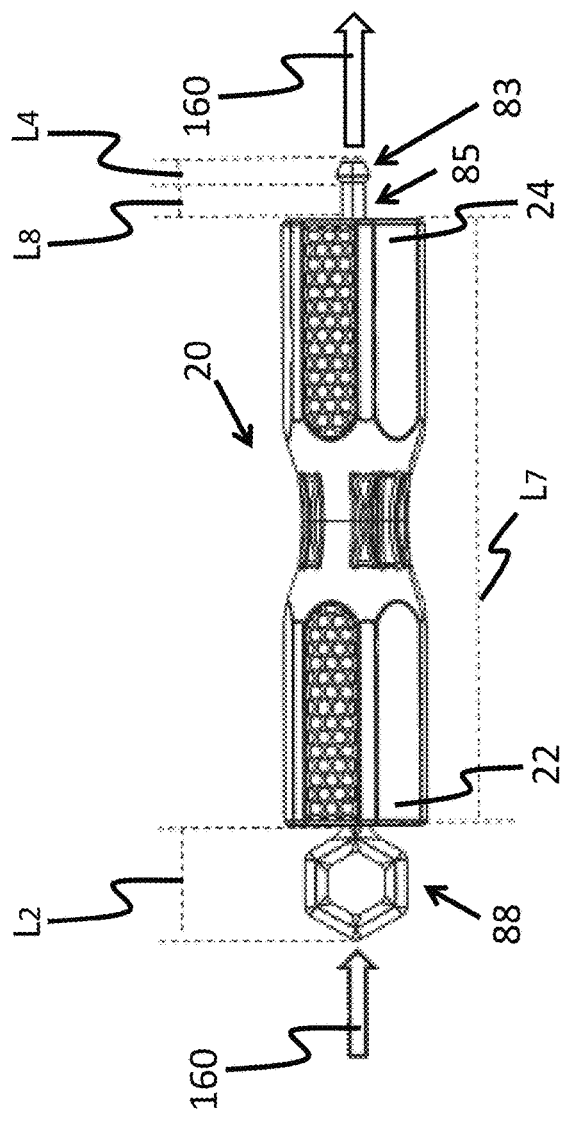
FIG. 12C
FIG. 12D

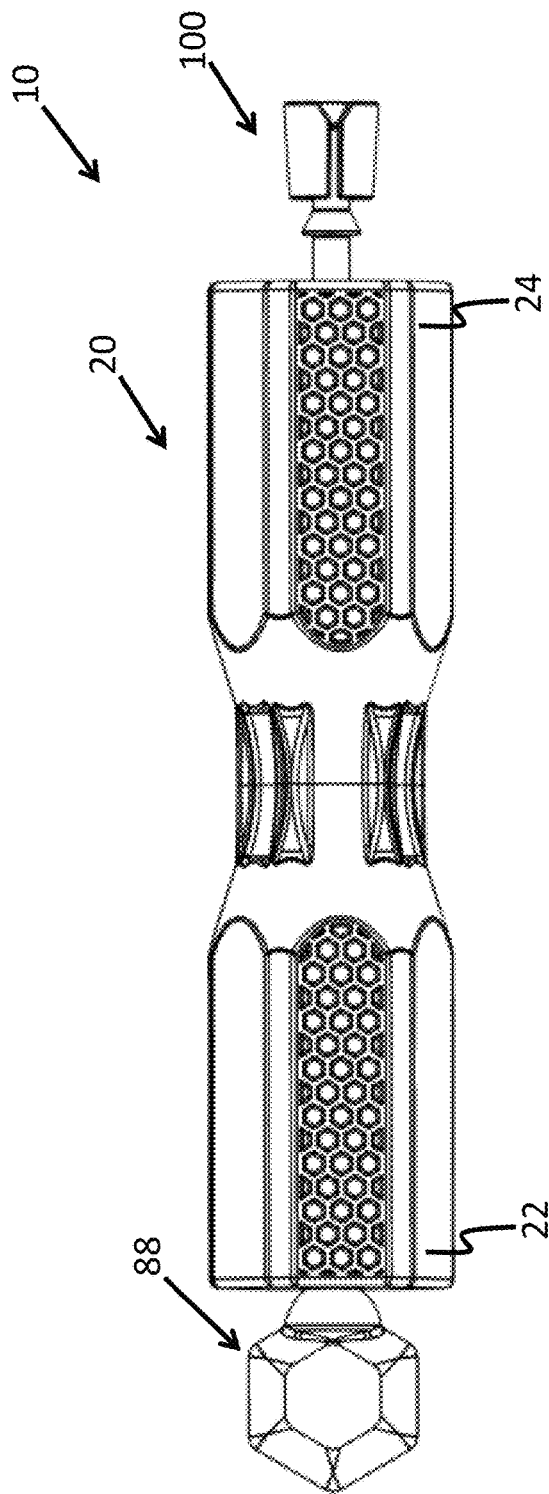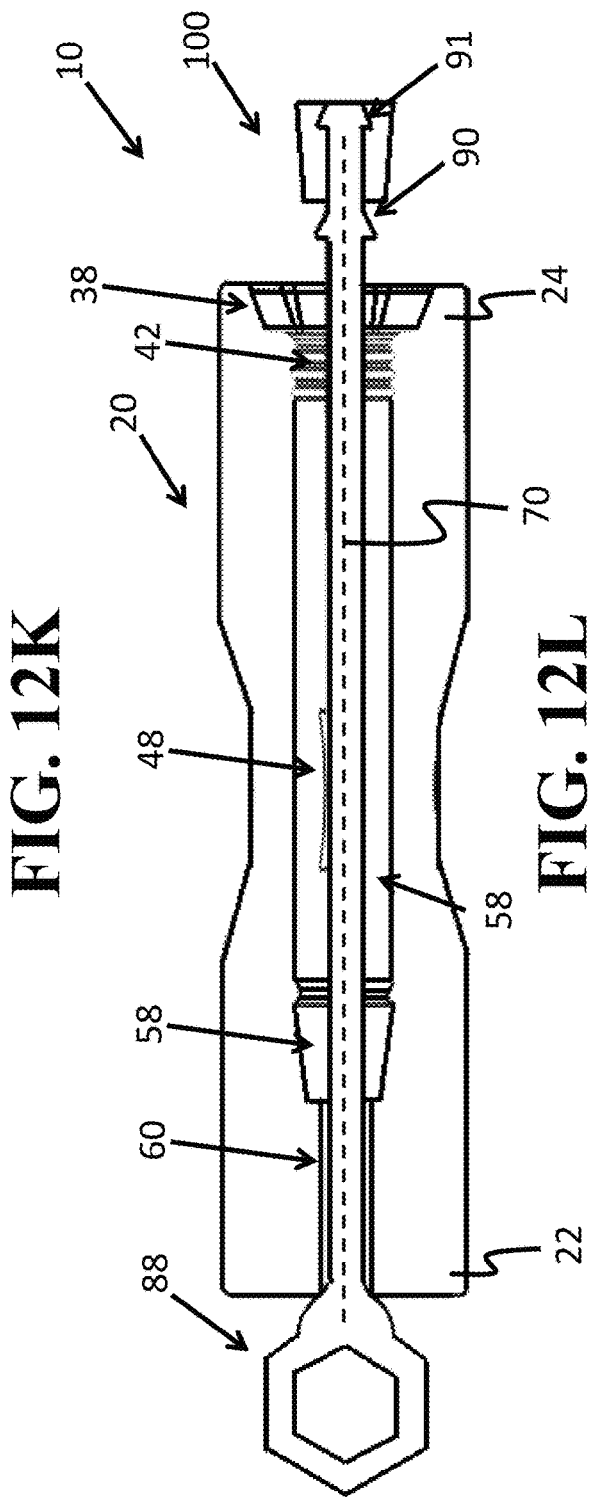
FIG. 12K
FIG. 12L

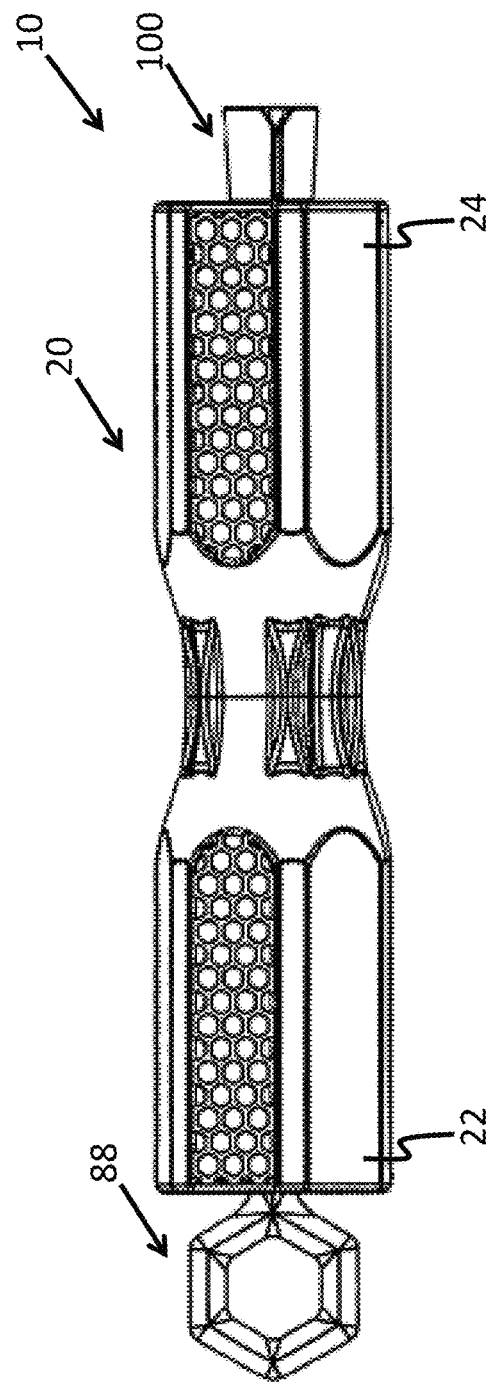
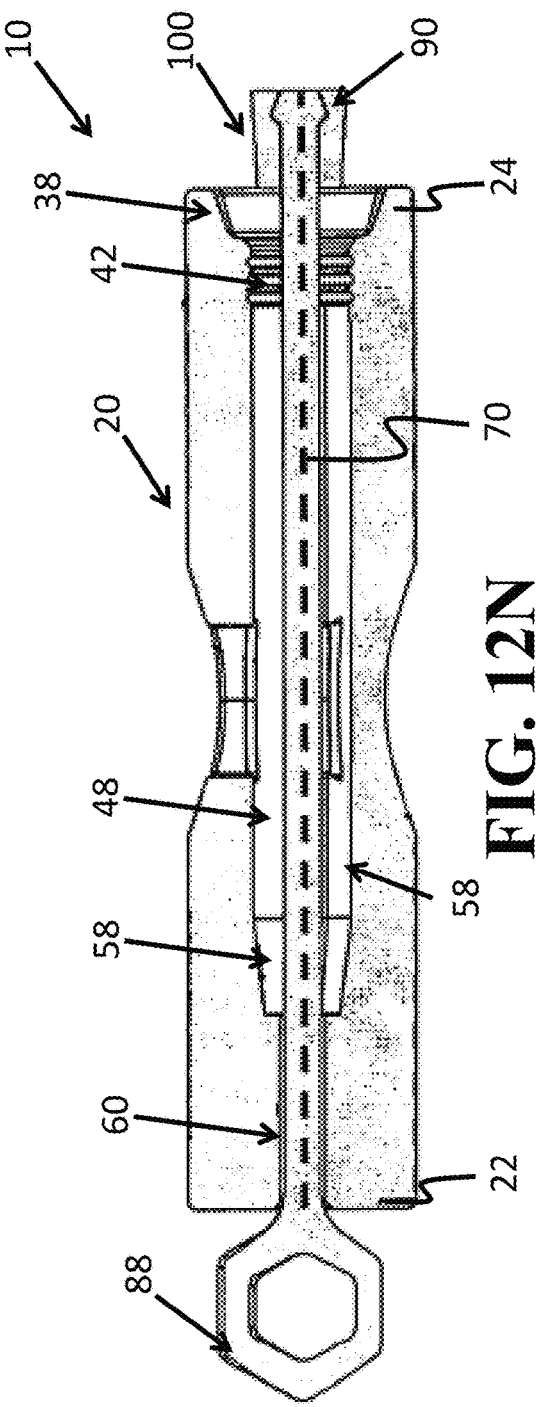
FIG. 12M
FIG. 12N

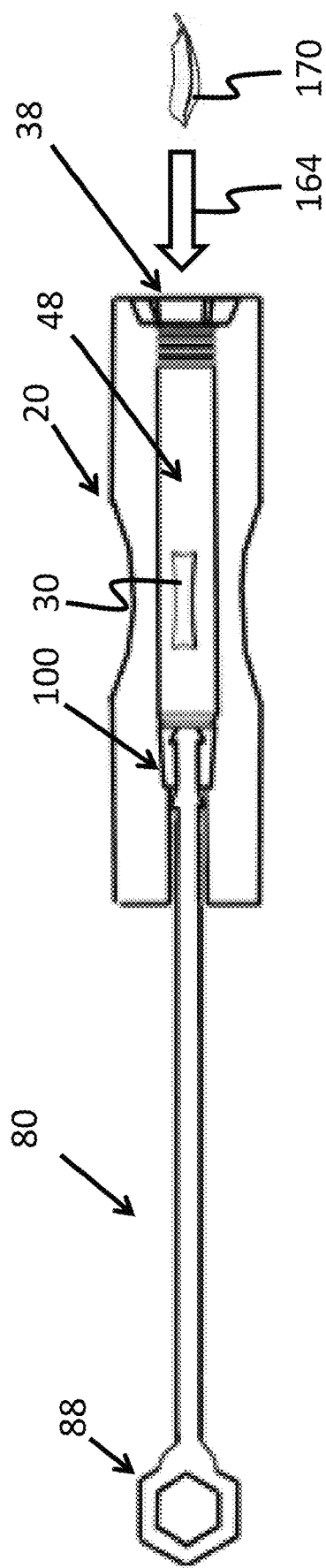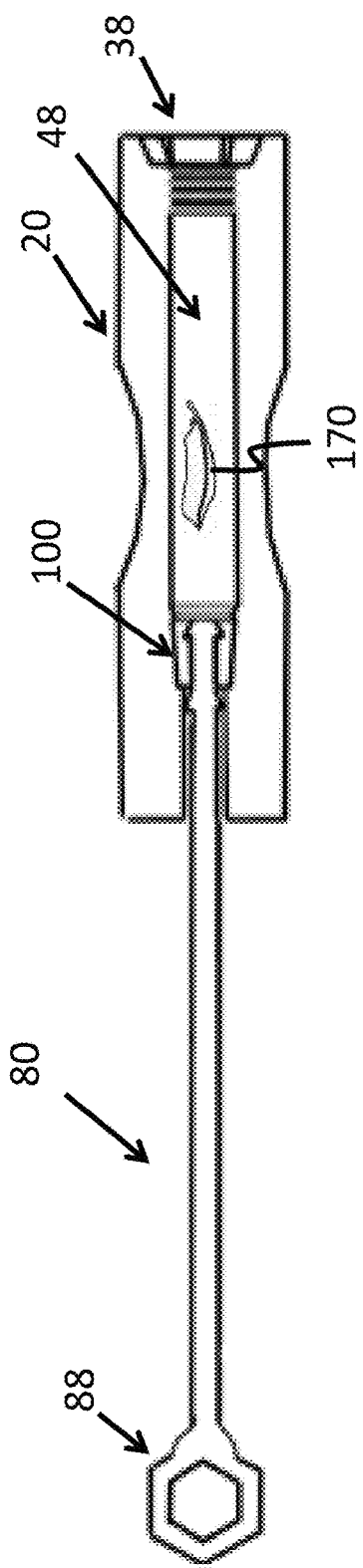
FIG. 12R
FIG. 12S

ANIMAL TRAINING BUMPER

CROSS-REFERENCES TO RELATED APPLICATIONS

This application is a non-provisional of and claims priority to U.S. Provisional Application No. 63/459,655, filed Apr. 16, 2023, entitled ANIMAL TRAINING BUMPER, which is hereby incorporated by reference in its entirety.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present disclosure relates generally to retrieving devices for animals and more particularly to retrieving devices for training dogs to retrieve downed game when hunting.

Various types of retrieving devices for animals are known in the art. One particular type of retrieving device is used for training dogs to retrieve downed game. Such a retrieving device may typically be referred to as a "dummy" or a "bumper." In use, a user may throw a dummy for the dog to search for and retrieve. In order to simulate the condition of the dummy being downed game, some dummies have a body with an internal cavity that may store an object with the scent of wild game (e.g., feathers, an object coated in scented oil, etc.).

One problem with conventional training dummies is durability. For example, conventional training dummies are typically thrown by the user via a handle that is attached to an end of the body. A tensile or centripetal force may be exerted by the handle on the body at the point of attachment and, after repeated throws, the point of attachment may break or rupture. Moreover, the body may suffer various wear-and-tear from repeated retrievals by the dog. Additionally, animals may easily chew and destroy conventional bumpers and dummies in a short period of time if left unattended.

Another problem with conventional dummies is the ergonomics of the dummy as it relates to the dog's retrieval process. Retrieval of the dummy (repeated retrievals, in particular) may be strenuous exercise for the dog. Many conventional training dummies feature a solid body that may block the oral respiratory path of the dog during retrieval, thus exasperating the strain that repeated retrievals impart on the dog.

What is needed, then, are improvements to retrieving devices for animals and specifically training dummies to address these and other problems.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure provides an animal training bumper apparatus with an axial passage that defines a first passage with a first passage diameter and a second passage with a second passage diameter. A sleeve may be disposed within the axial passage, having an outer sleeve diameter that is greater than the first passage diameter. The apparatus may include a handle disposed on the sleeve. For instance, the handle may include one or more knobs which may be received in the sleeve.

A length of the handle may be greater than a length of the body, such that the handle may be advanced through the axial passage until an end of the sleeve extends from the axial passage at one end of the body. The sleeve may then be secured to such end of the handle, and the handle may then be retracted towards to the opposite end of the body. In some embodiments, the axial passage also defines a taper section between the first passage and the second passage. The sleeve may be received within the taper section. For instance, the outer diameter of the sleeve may forms a taper that corresponds to a diameter of the taper section.

Numerous other objects, advantages and features of the present disclosure will be readily apparent to those of skill in the art upon a review of the following drawings and description of a preferred embodiment.

BRIEF DESCRIPTION OF THE DRAWINGS

FIG. 1B is a front elevated view of an embodiment of an animal training bumper apparatus in accordance with the present disclosure.

FIG. 1C is a front elevated view of an embodiment of an animal training bumper apparatus in accordance with the present disclosure.

FIG. 3A is a side exploded view of an embodiment of an animal training bumper apparatus in accordance with the present disclosure.

FIG. 3B is a side exploded view of an alternative embodiment of an animal training bumper apparatus in accordance with the present disclosure.

FIG. 9C is a cross-sectional view of an alternative embodiment of a body for an animal training bumper apparatus in accordance with the present disclosure.

FIG. 9D is a side cross-sectional view of an alternative embodiment of a body for an animal training bumper apparatus in accordance with the present disclosure.

FIG. 12C is a schematic view of an alternative embodiment of a first step for assembling an animal training bumper apparatus in accordance with the present disclosure.

FIG. 12D is a schematic view of an alternative embodiment of a second step for assembling an animal training bumper apparatus in accordance with the present disclosure.

FIG. 12K is a side elevated view of an embodiment of a third step for assembling an animal training bumper apparatus in accordance with the present disclosure.

FIG. 12L is a cross-sectional view of an embodiment of a third step for assembling an animal training bumper apparatus in accordance with the present disclosure.

FIG. 12M is a side elevated view of an embodiment of a third step for assembling an animal training bumper apparatus in accordance with the present disclosure.

FIG. 12N is a cross-sectional view of an embodiment of a third step for assembling an animal training bumper apparatus in accordance with the present disclosure.

FIG. 12R is a cross-sectional view of an embodiment of a fifth step for assembling an animal training bumper apparatus in accordance with the present disclosure.

FIG. 12S is a cross-sectional view of an embodiment of a fifth step for assembling an animal training bumper apparatus in accordance with the present disclosure.

DETAILED DESCRIPTION

Figure 1A:
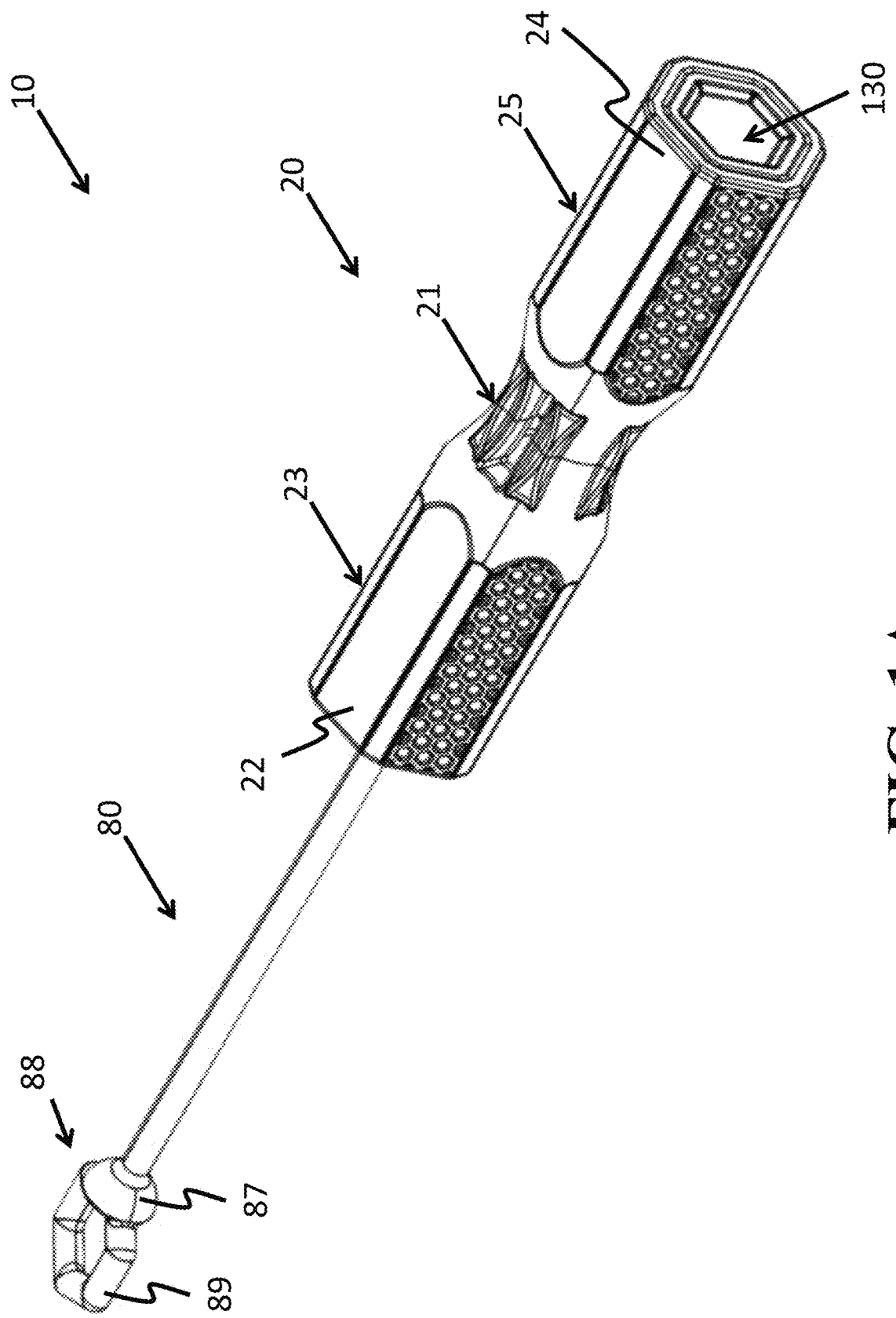
FIG. 1A is a perspective view of an embodiment of an animal training bumper apparatus in accordance with the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Referring now to FIGS. 1A-1C and 2A-2B, an embodiment of an animal training bumper apparatus (apparatus) 10 is shown, according to some embodiments. The apparatus 10 includes a handle 80, a body 20, and a plug 130. The handle 80 may include a first end 88 with a loop 89 and a molded hemisphere 87. As discussed in greater detail herein, the body 20 may include an axial passage 48 extending therethrough, a first section 23 terminating at a first end 22 that forms a first opening 50, a second section 25 terminating at a second end 24 that forms a second opening 38, and a midsection 21 positioned between the first section 23 and the second section 25. Accordingly, the apparatus 10 may include the body 20 with the axial passage 48 extending between the first opening 50 on the first end 22 of the body 20 and the second opening 38 on the second end 24 of the body 20 opposite the first end 22.

Referring now to FIGS. 1D-1F and 2C, an alternative embodiment of the apparatus 10 is shown, according to some embodiments of the present disclosure. As described in greater detail below, in alternative embodiments the apparatus 10 may include one or more differences in the handle 80 and the body 20. For example, in such alternative embodiments, the handle 80 may not include the molded hemisphere 87 as it is shown with reference to FIGS. 1A-1C.

Referring now to FIG. 3A, an embodiment of the apparatus 10 is shown in an exploded view, according to some embodiments. As shown, the apparatus 10 may further include a sleeve 100. As discussed in greater detail below with reference to FIGS. 5A-5E and FIGS. 12E-12G, the sleeve 100 may be formed to receive (e.g., hold, secure, grasp, etc.) a portion of the handle 80, such that the handle 80 is disposed on the sleeve 100. For instance, the sleeve 100 may be secured to a second end 89 of the handle 80. In other words, the handle 80 may be disposed on the sleeve 100.

Figure 1D:
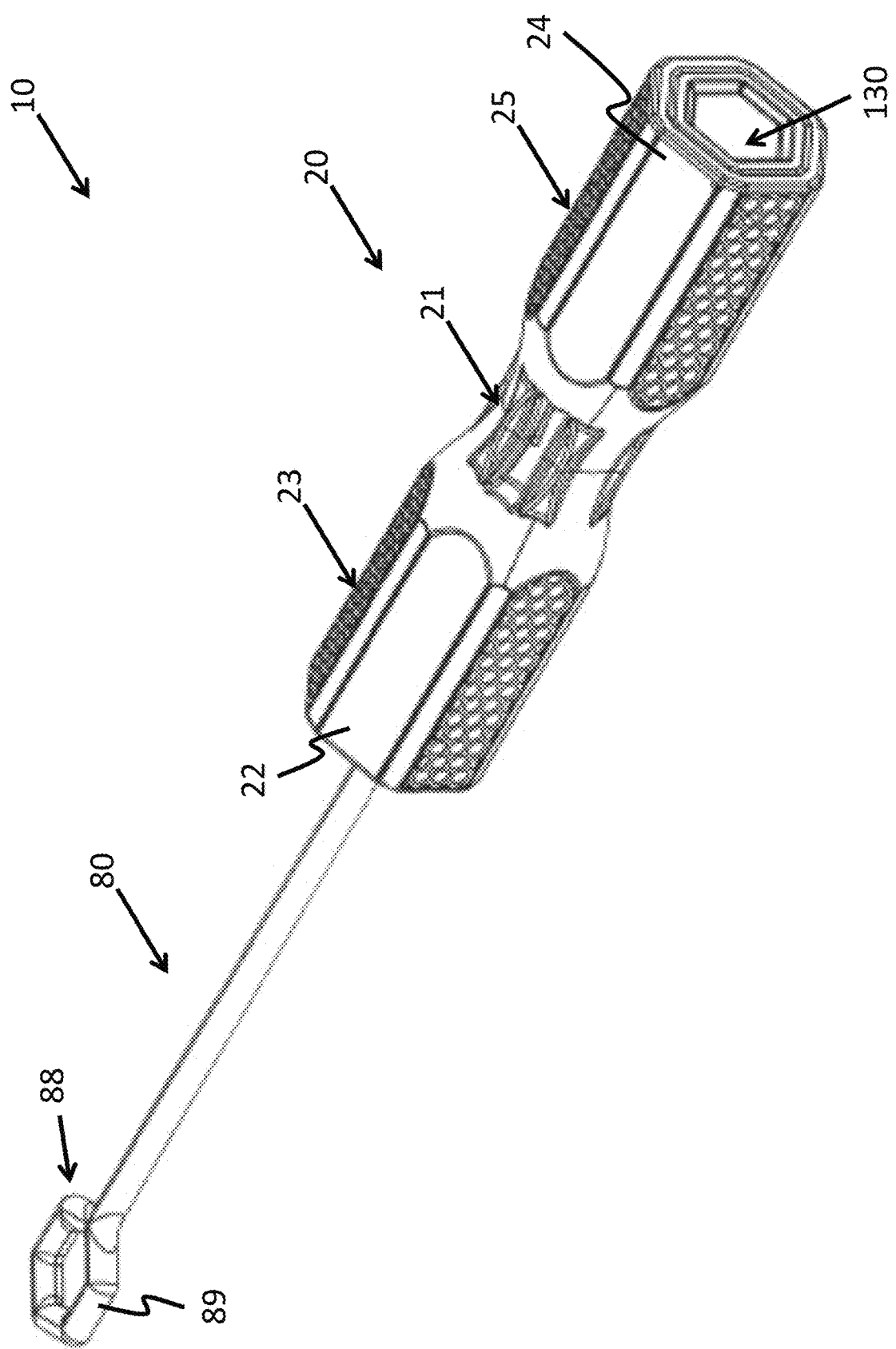
FIG. 1D is a perspective view of an alternative embodiment of an animal training bumper apparatus in accordance with the present disclosure.
Figure 1E:
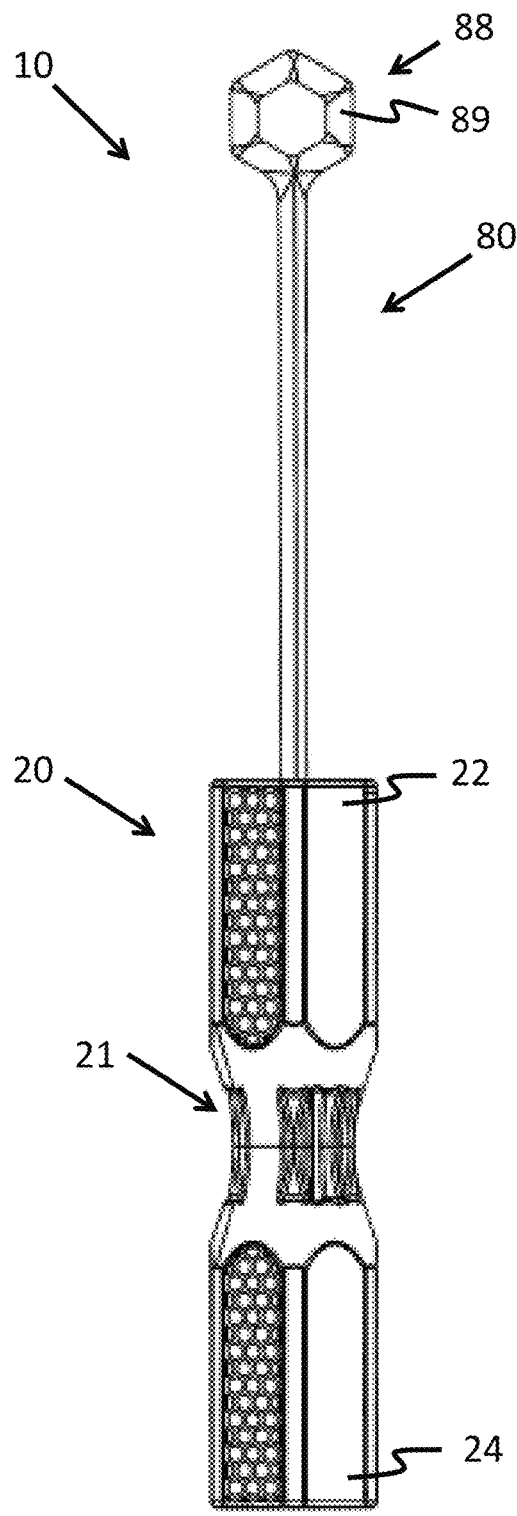
FIG. 1E is a front elevated view of an alternative embodiment of an animal training bumper apparatus in accordance with the present disclosure.
Figure 1F:
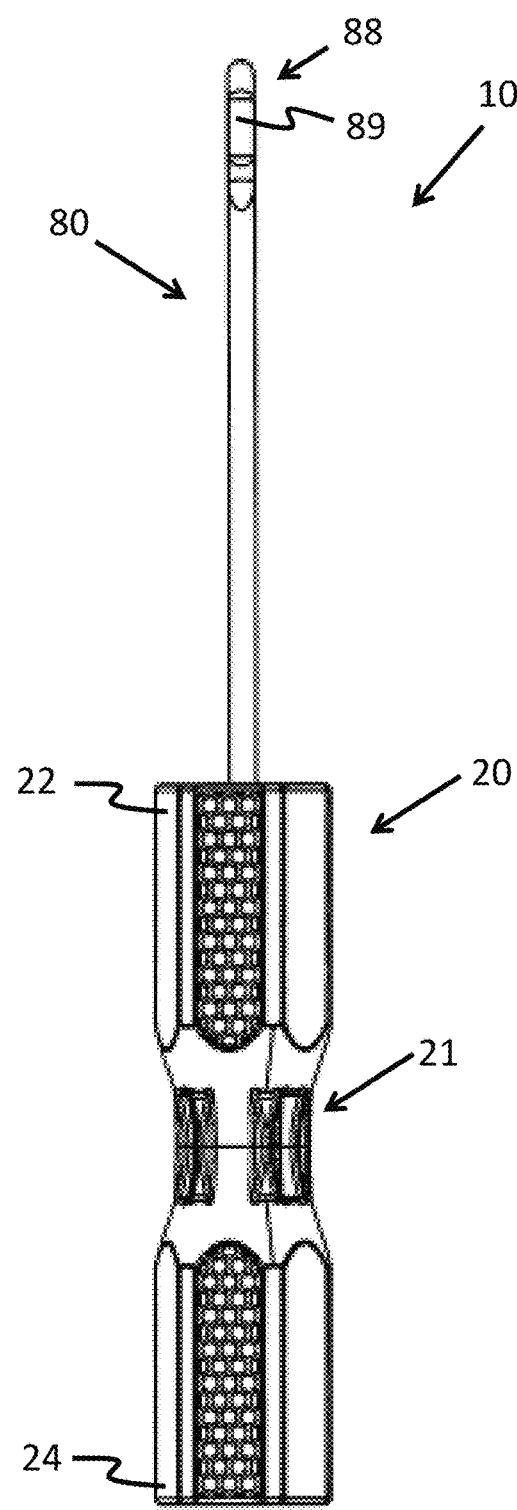
FIG. 1F is a front elevated view of an alternative embodiment of an animal training bumper apparatus in accordance with the present disclosure.
Figure 2A:
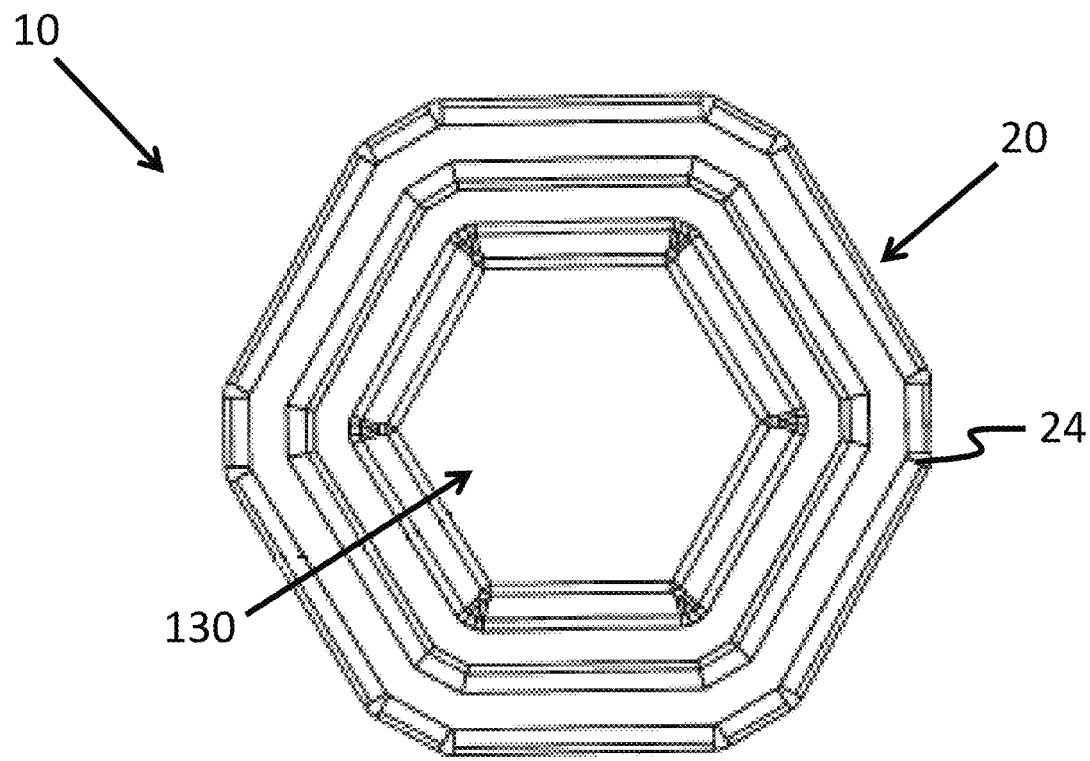
FIG. 2A is a bottom view of an embodiment of an animal training bumper apparatus in accordance with the present disclosure.
Figure 2B:
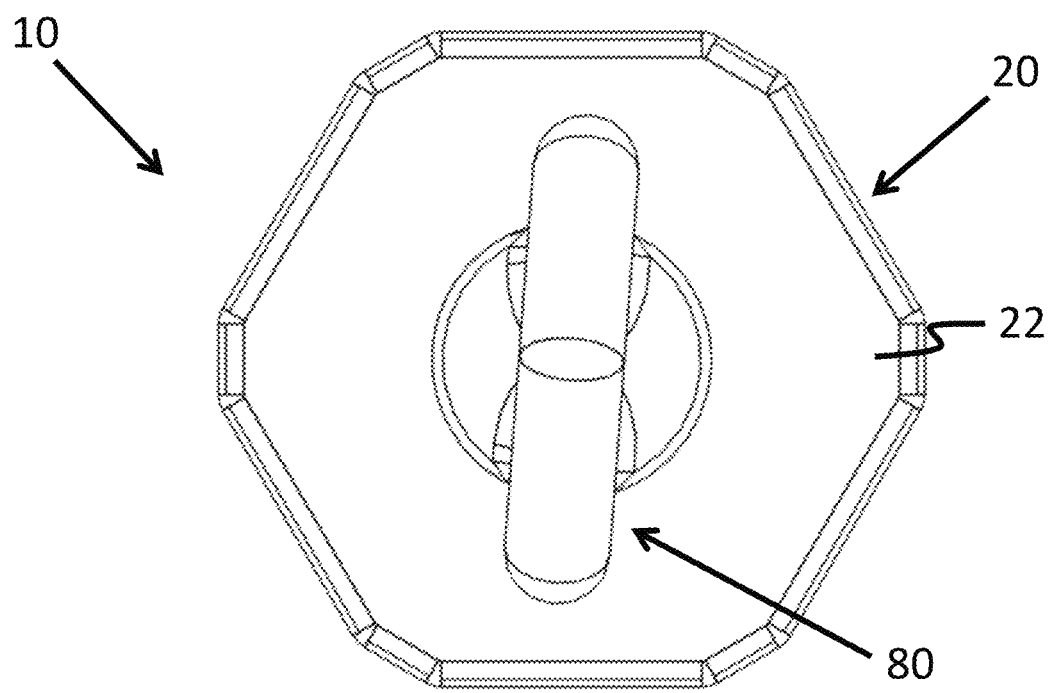
FIG. 2B is a top view of an embodiment of an animal training bumper apparatus in accordance with the present disclosure.
Figure 2C:
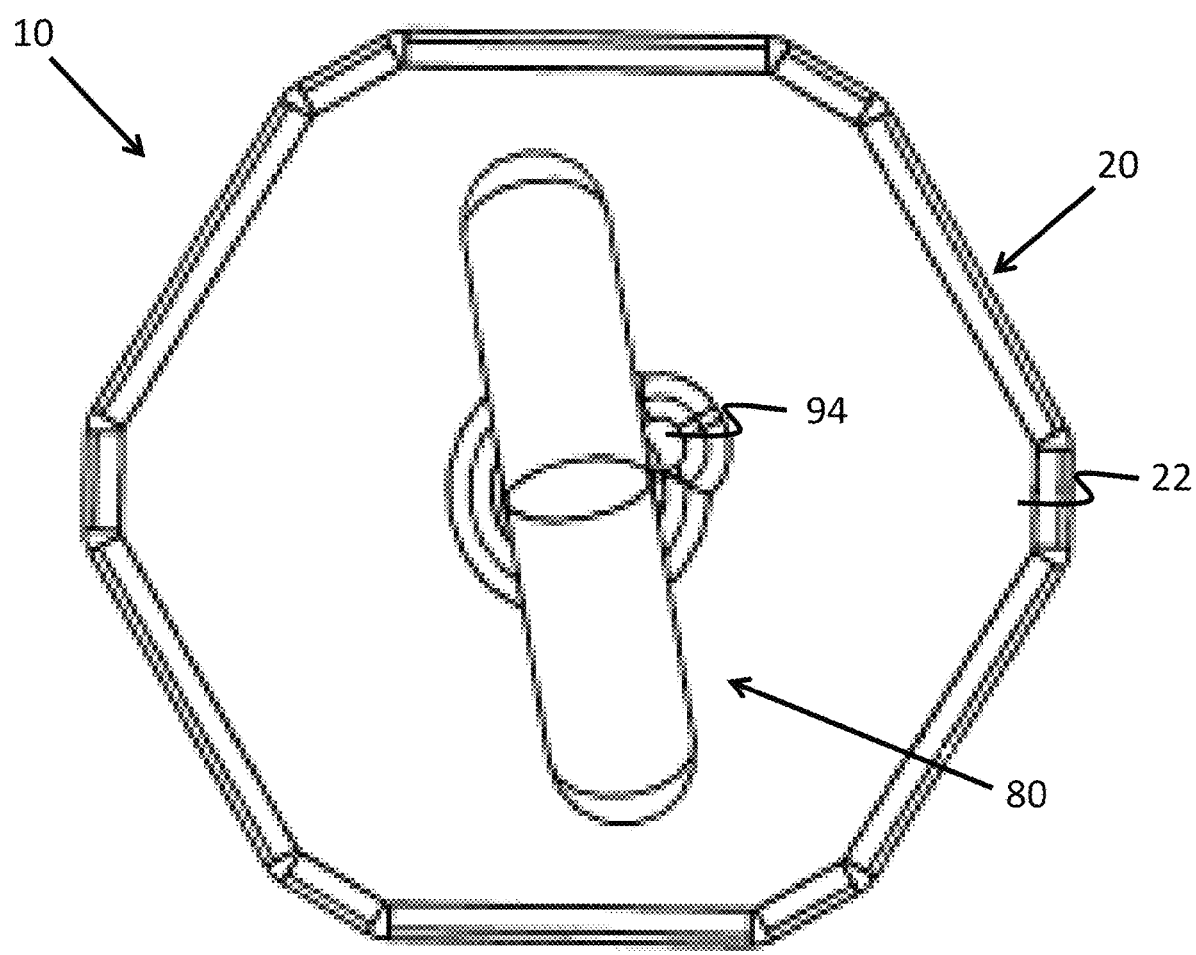
FIG. 2C is a top view of an alternative embodiment of an animal training bumper apparatus in accordance with the present disclosure.

As mentioned above, the body 20 may include the axial passage 48. The sleeve 100 may be disposed in the axial passage 48. In turn, the handle 80 may be disposed in the axial passage 48. In some embodiments, the body 20, the handle 80, the plug 130, and the sleeve 100 are positioned and/or aligned on a longitudinal axis (axis) 70. As shown in FIG. 3B, the apparatus 10 in such alternative embodiments as shown with reference to FIGS. 1D-1F is similarly depicted in an exploded view.

Figure 4A:
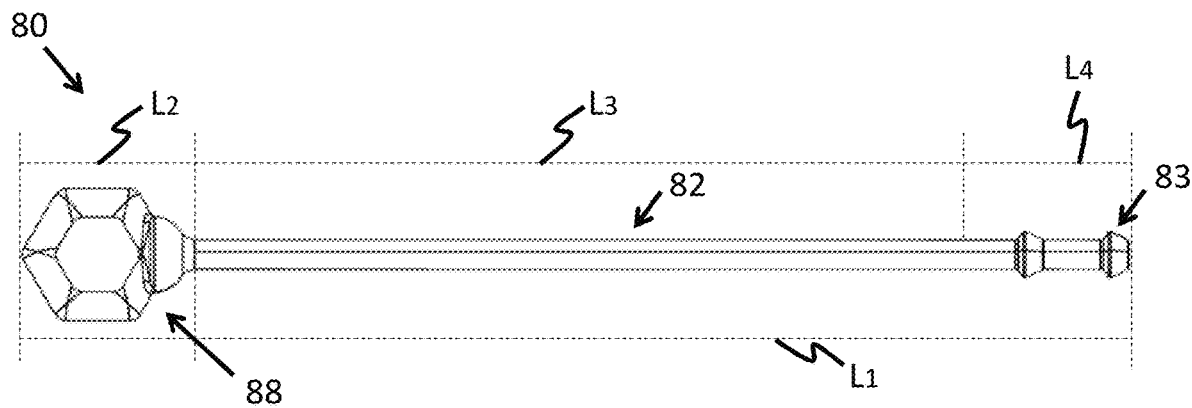
FIG. 4A is a side elevated view of an embodiment of a handle for an animal training bumper apparatus in accordance with the present disclosure.
Figure 4B:
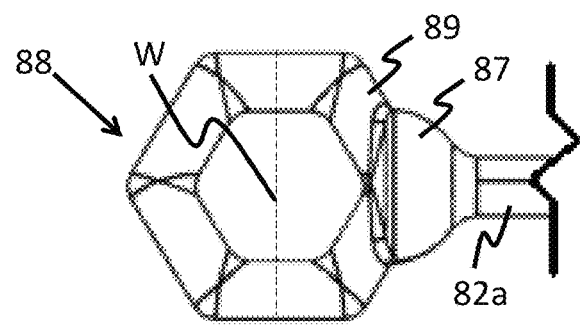
FIG. 4B is a side elevated view of an embodiment of a loop for a handle in accordance with the present disclosure.
Figure 4C:
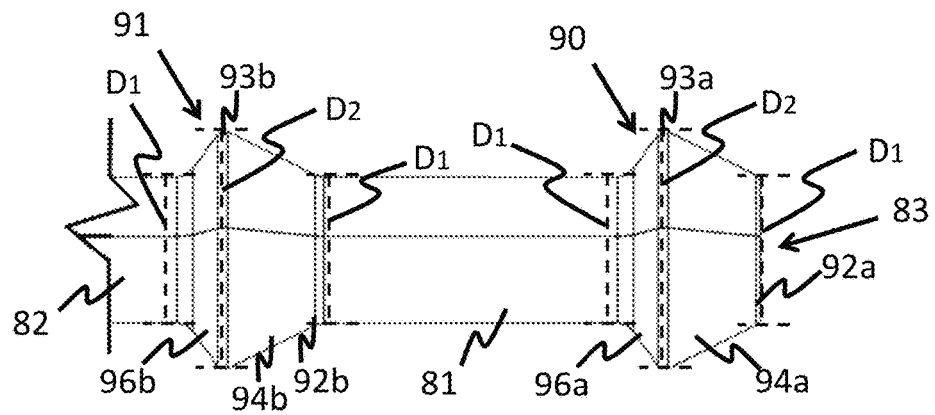
FIG. 4C is a side elevated view of an embodiment of a knob for a handle in accordance with the present disclosure.

Referring now to FIGS. 4A-4C, the handle 80 is shown in greater detail, according to some embodiments. In some embodiments, the handle 80 is a fibrous rope. In other embodiments, the handle 80 is made of a material such as Ethylene-vinyl acetate (EVA), nylon, polycarbonate, rubber, or some other suitably flexible yet durable material. Referring particularly to FIG. 4A, the handle 80 may include an intermediate section 82 in between the first end 88 and a second end 83 of the handle 80. An entire length of the handle 80 may be defined as $L_1$. In some embodiments, the handle 80 includes the loop 89 formed at the first end 88 (as shown with particular reference to FIG. 4B). As shown with particular reference to FIG. 4B, the first end 88 of the handle 80 (e.g., the loop 89) may have a width W. The width W of the first end 88 of the handle 80 may be greater than a diameter $D_{13}$ of the first opening 50 of the body, such that the first end 88 of the handle 80 is prevented from being advanced or retracted through the first opening 50. However, as discussed in greater detail below, the handle 80 may only be removable from the axial passage 48 via the first opening 50. Thus, in some embodiments, the first end 88 of the handle 80 must be retracted away from the first end 22 of the body 20 in order to remove the handle 80 from the axial passage 48.

The handle 80 may further include the molded hemisphere 87 where the loop 89 meets the first end 88. In other words, the first end 88 of the handle 80 may further include the molded hemisphere 87, either in addition to, or instead of, the loop 89. Of course, depending on the implementation, the first end 88 of the handle 80 may include any number of configured shapes or structures suitable to provide the animal training apparatus discussed herein.

Figure 4D:
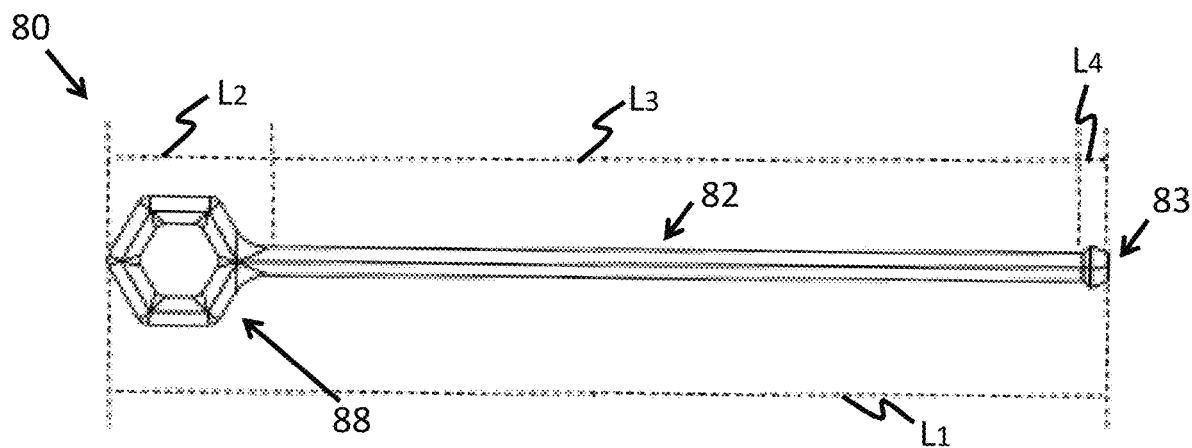
FIG. 4D is a side elevated view of an alternative embodiment of a handle for an animal training bumper apparatus in accordance with the present disclosure.
Figure 4E:
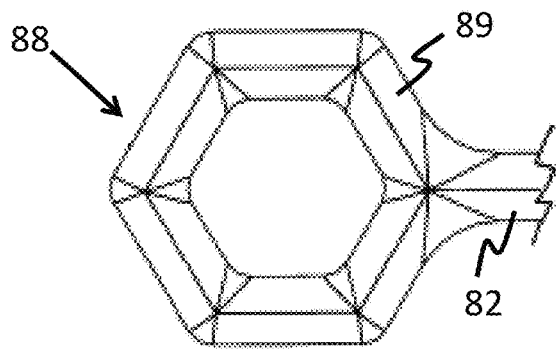
FIG. 4E is a side elevated view of an alternative embodiment of a loop for a handle in accordance with the present disclosure.

Advantageously, the molded hemisphere 87 may be formed about the loop 89 in order to provide a larger or more secure grip for throwing the apparatus 10. As shown in FIG. 4A, $L_1$ is the combination of a length of the first end 88 (e.g., the loop 89, depending on the embodiment) defined as $L_2$, a length of the intermediate section 82 defined as $L_3$, and a length of the second end 83 defined as $L_4$. As shown with reference to FIGS. 4D-4E, in alternative embodiments of the apparatus 10, the handle 80 may not include the molded hemisphere 87.

Referring particularly to FIG. 4C, the handle 80 may include a first knob 90 formed at the second end 83 of the knob 80. The first knob 90 may be configured to be received by the sleeve 100. In some embodiments, the handle 80 further includes a second knob 91. The second knob 91 may be configured to be received by the sleeve 100.

In some embodiments, the first knob 90 is located at the second end 83, while the second knob 91 may be spaced a distance away from the first knob 90 in the direction of the first end 88 of the handle 80. Thus, an end section 81 (formed similar to the intermediate section 82) may separate the first and second knobs 90, 91. While generally referred to hereafter as "knobs," it should be appreciated that, depending on the embodiments, various shapes and members may be formed at the second end 83 (e.g., spheres, cylinders, blocks, etc.). Furthermore, depending on the implementation, the handle 80 may include only the first knob 90, only the second knob 91, or both the first and second knob 90.

Figure 4F:
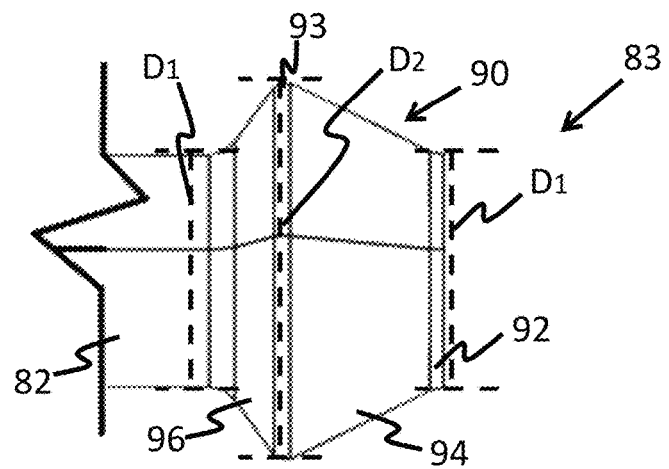
FIG. 4F is a side elevated view of an alternative embodiment of a knob for a handle in accordance with the present disclosure.

The first and second knobs 90, 91 may each include a first angled knob surface 96 (96a for the first knob 90, and 96b for the second knob 91) angled relative to the axis 70 shown with reference to FIG. 3, according to some embodiments) and a second angled knob surface 94 (94a for the first knob 90, and 94b on the second knob 91). The first angled knob surface 96 and the second angled knob surface 94 may meet at an outer crest 93 (93a for the first knob 90, and 93b for the second knob 91). As shown, the outer crest 93 may define an outer diameter $D_2$ that is greater than each of an outer diameter $D_1$ of the intermediate and end sections 82, 81. As discussed in greater detail below with reference to FIGS. 12C-12E, the formation of the first and second knobs 90, 91 (e.g., the first angled knob surface 96 and the second angled knob surface 94) may allow for secure engagements between the first and second knobs 90, 91 and the sleeve 100. As shown with reference to FIG. 4F, in alternative embodiments of the apparatus 10, the handle 80 may only include the first knob 90.

Referring now to FIGS. 5A-5E, the sleeve 100 is shown in greater detail, according to some embodiments. The sleeve 100 may be made of any suitable material including, but not limited to, silicon, rubber, nylon, and EVA. As shown, the sleeve 100 may be annular or tubular in shape.

Figure 5A:
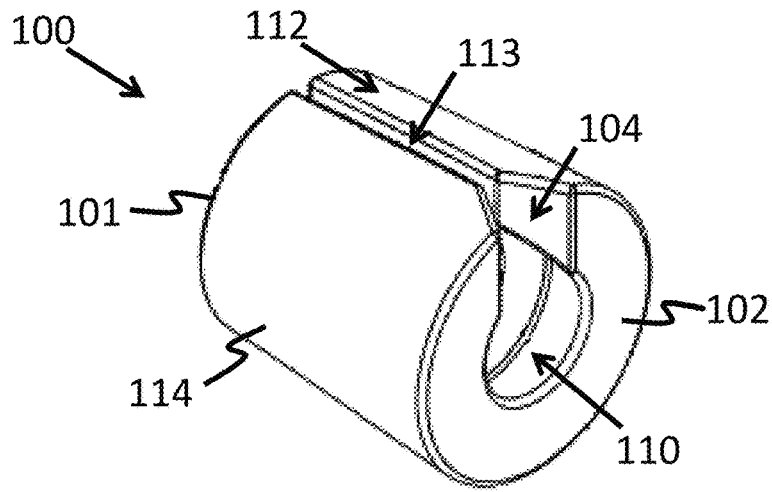
FIG. 5A is a side perspective view of an embodiment of a sleeve for an animal training bumper apparatus in accordance with the present disclosure.
Figure 5B:
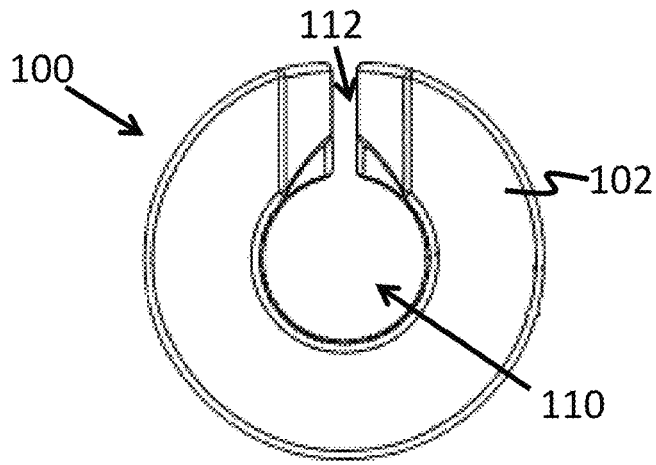
FIG. 5B is a front elevated view of an embodiment of a sleeve for an animal training bumper apparatus in accordance with the present disclosure.
Figure 5C:
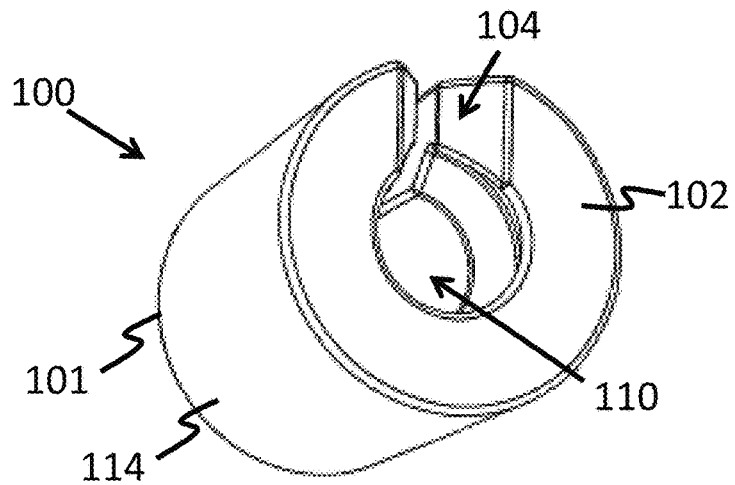
FIG. 5C is a front perspective view of an embodiment of a sleeve for an animal training bumper apparatus in accordance with the present disclosure.

Referring particularly to FIGS. 5A-5C, the sleeve 100 may include an outer sleeve surface 114 and a sleeve cavity 110 each extending between a first sleeve end 101 and a second sleeve end 102, thus defining a sleeve body (particularly shown with reference to FIG. 5E) defined between the outer sleeve surface 114 and the sleeve cavity 110. The sleeve 100 may further include a slot 112 extending between the first sleeve end 101 and the second sleeve end 102, thus providing an open channel between regions outside of the outer sleeve surface 114 and the sleeve cavity 110. The slot 112 may include an elongate slot region 113 extending from the first sleeve end 101 to meet a chamfer slot region 104 extending from the second sleeve end 102.

Figure 5D:
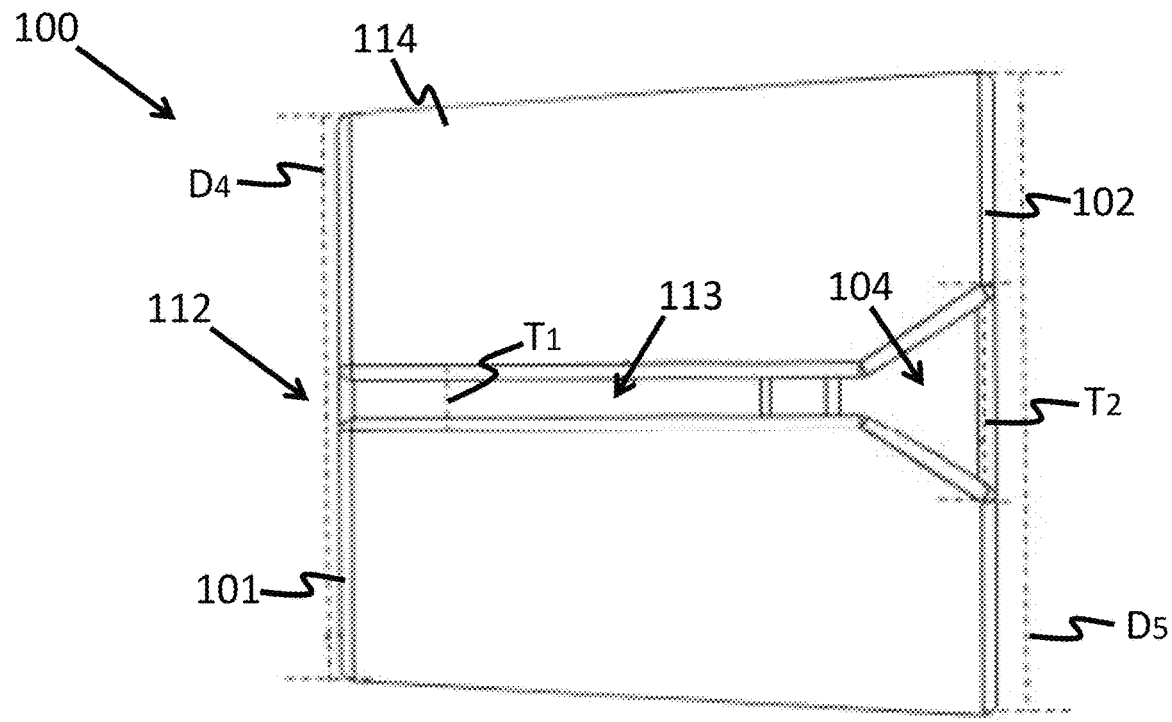
FIG. 5D is a top view of an embodiment of a sleeve for an animal training bumper apparatus in accordance with the present disclosure.

Referring particularly to FIG. 5D, the sleeve 100 may form a taper. For example, the outer surface 114 may define a fourth diameter $D_4$ at the first sleeve end 101 and a second diameter $D_5$ at the second sleeve end 102 that is greater than $D_4$. In other words, the sleeve 100 may define an outer sleeve diameter that reduces from the second sleeve end 102 (e.g., $D_5$) to the first sleeve end 101 (e.g., $D_4$). In any case, the outer sleeve diameter (e.g., the second and fourth diameters $D_5$, $D_4$, and any diameter over the reduction therebetween) may be greater than the first passage diameter $D_9$. Thus, the sleeve 100 may not be removable from the axial passage 48 when the handle 80 is secured to the sleeve 100 as described herein. As discussed in greater detail below, the handle 80 may only be removable from the sleeve 100 upon advancing the sleeve 100 through the second opening 38 (where a user may then access the sleeve 100 to remove the sleeve 100 from the handle 80. Regarding the slot 112 mentioned above, the elongate slot region 113 may define a thickness $T_1$ for the channel provided by the slot 112, while the chamfer slot region 104 may increase in such a thickness from $T_1$ to $T_2$.

Figure 5E:
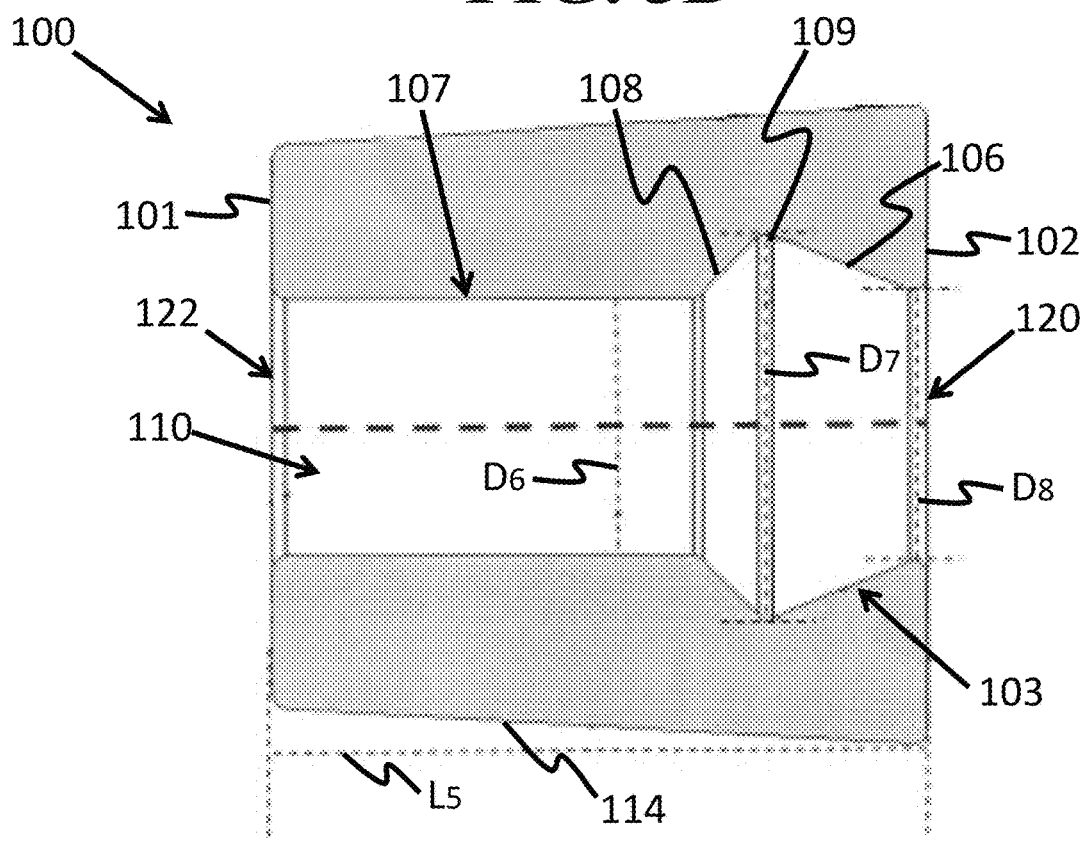
FIG. 5E is a cross-sectional view of an embodiment of a sleeve for an animal training bumper apparatus in accordance with the present disclosure.

Referring particularly to FIG. 5E, a cross-sectional view of the sleeve 100 is shown, according to some embodiments. As shown, an entire length of the sleeve 100 may be defined as $L_5$. In some embodiments, the sleeve cavity 110 may extend from a first sleeve opening 122 formed at the first sleeve end 101 to a second sleeve opening 120 formed at the second sleeve end 102. The sleeve cavity 110 may include a barrel section 107 and a knob section 103. The barrel section 107 of the sleeve cavity 110 may extend from the first sleeve opening 122 to the knob section 103 and include an inner barrel surface 116 that defines an inner diameter $D_6$. The knob section 103 of the sleeve passage 100 may extend from the barrel section 107 to the second sleeve opening 120. The knob section 103 may include a first angled sleeve surface 108 (angled relative to the axis 70 depicted with reference to FIG. 3A, for example) and a second angled sleeve surface 106 situated between the second sleeve opening 120 and the barrel section 107. The first angled sleeve surface 108 and the second angled sleeve surface 106 may meet at an inner crest 109. As shown, the inner crest 109 may define an inner diameter $D_7$ that is greater than each of De and an inner diameter $D_8$ defined by the second sleeve opening 120. As discussed in greater detail below with reference to FIGS. 12E-12G, the formation of the knob section 107 (e.g., the first angled sleeve surface 108 and the second angled sleeve surface 106) may allow for a secure engagement between either of the first or second knobs 90, 91 and the sleeve 100.

Figure 6:
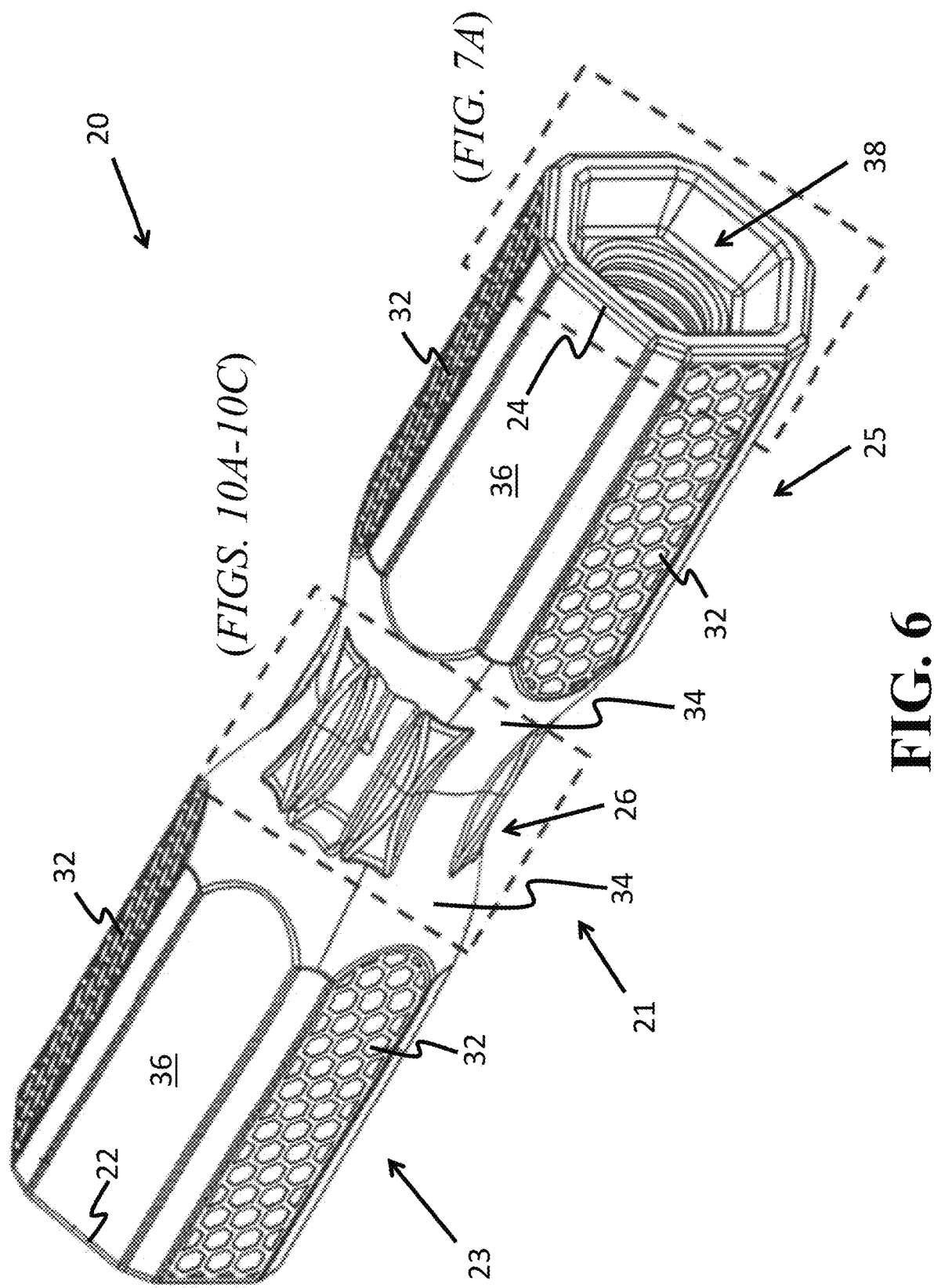
FIG. 6 is a side perspective view of an embodiment of a body for an animal training bumper apparatus in accordance with the present disclosure.

Referring now to FIG. 6, the body 20 is shown in greater detail, according to some embodiments. As mentioned above, the body 20 includes the first section 23 terminating at the first end 22, the second section 25 terminating at second end 24, and the midsection 21 positioned between the first section 23 and the second section 25. As described in greater detail below with reference to FIGS. 7A-7B, the second end 24 may form a second opening 38 that is formed to receive the plug 130. The first section 23 and the second section 25 may each feature one or more textured regions 32 and/or one or more smooth regions 36. In some embodiments, the midsection 21 itself may form a recessed region 26 situated in between a pair of slopes 34. As described in greater detail below with reference to FIGS. 10A-10D, the recessed region 26 may include one or more apertures and/or ridges that form an ergonomic surface on which an animal may grasp with its mouth.

In some embodiments, the body 20 is made of a closed-cell foam. For example, the body 20 may be made of EVA. EVA foam may provide a durable, buoyant composition of the body 20, such that the body 20 may withstand repeated exercises with an animal where the animal grasps the body 20 in its mouth. Moreover, the body 20 may be buoyant enough to allow the apparatus 10 to float, in cases where the apparatus 10 is thrown into a body of water or wetland. In some cases, the body 20 may be made of a composition of EVA foam and one or more other materials such as a thermoplastic resin. For example, the body 20 may be made from a combination of EVA foam at a composition of between about ninety-two and ninety-three percent and thermoplastic resin at a composition of between about eight and seven percent.

Figure 7A:
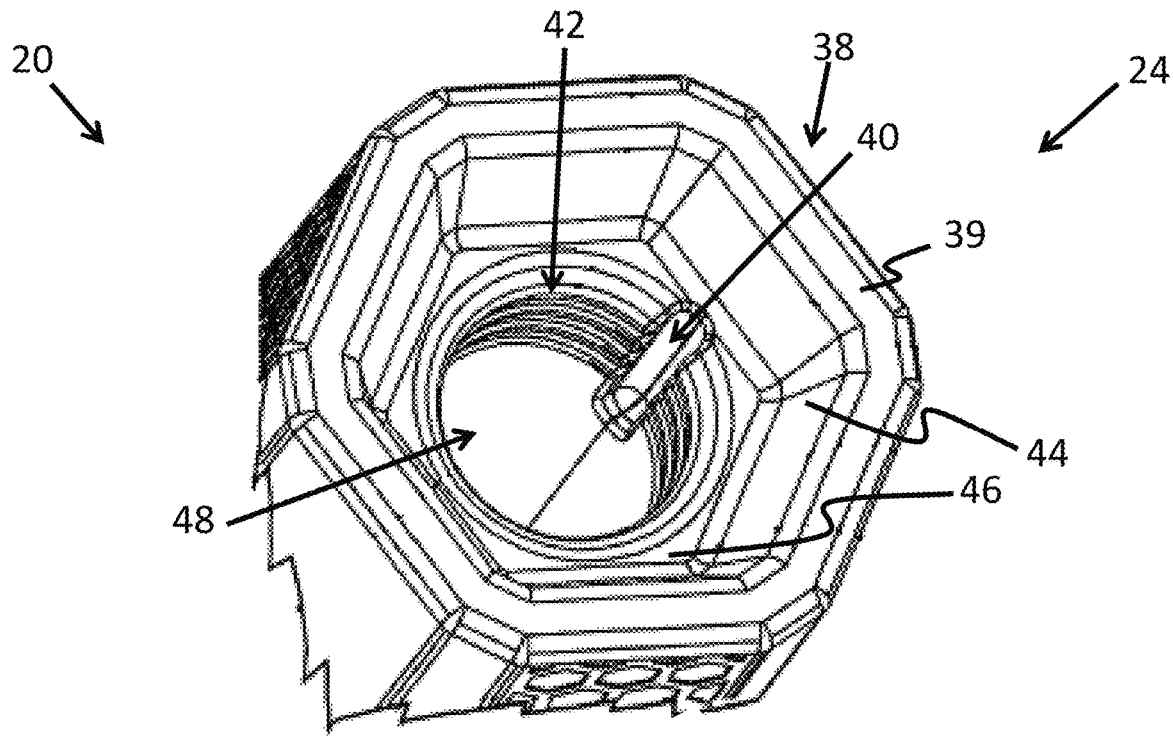
FIG. 7A is a rear perspective view of an embodiment of a body for an animal training bumper apparatus in accordance with the present disclosure.
Figure 7B:
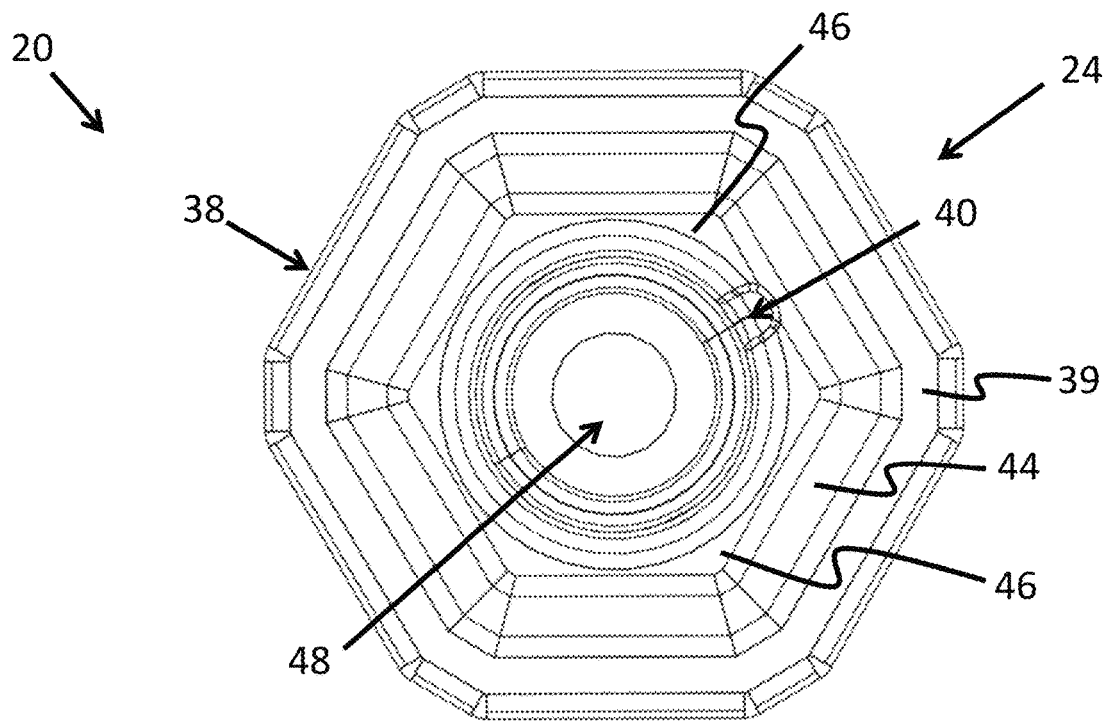
FIG. 7B is a rear elevated view of an embodiment of a body for an animal training bumper apparatus in accordance with the present disclosure.
Figure 7C:
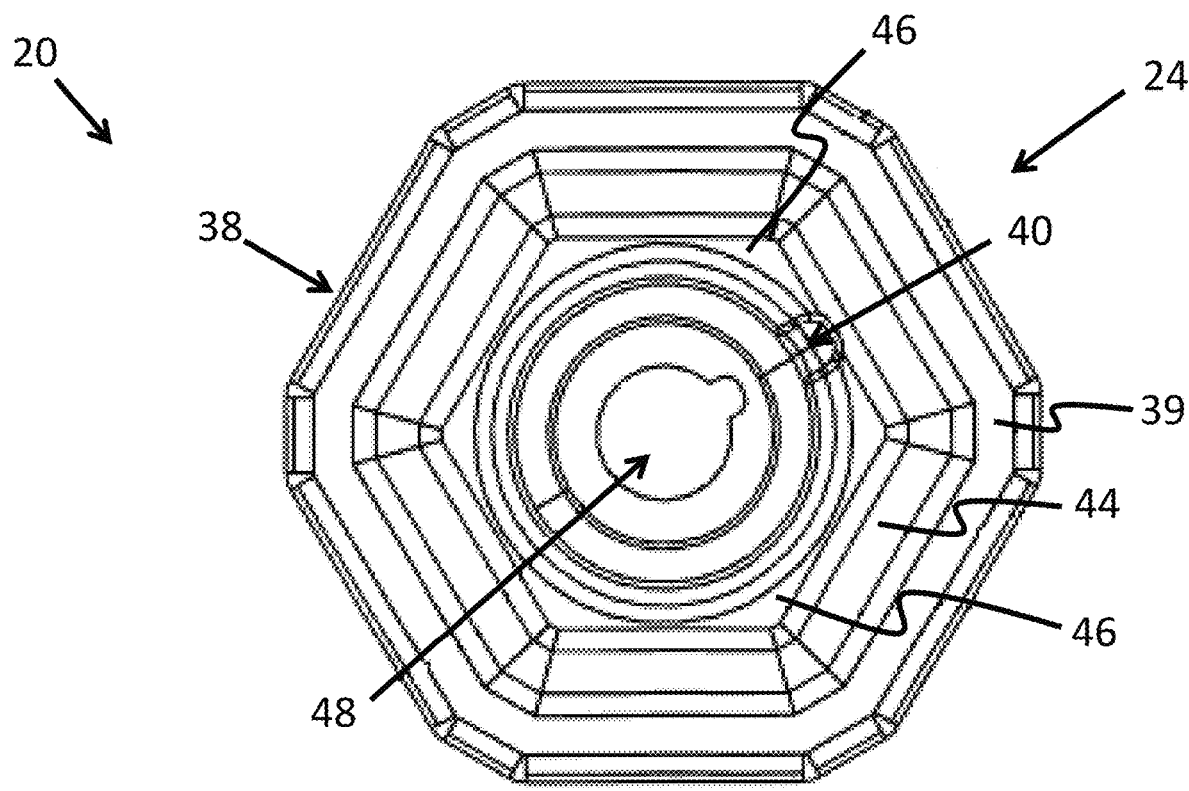
FIG. 7C is a rear elevated view of an alternative embodiment of a body for an animal training bumper apparatus in accordance with the present disclosure.

Referring now to FIGS. 7A and 7B, the second end 24 of the body 20 is shown in greater detail, according to some embodiments. As mentioned above, the second end 24 may form the second opening 38. The second opening 38 may include a distal outer lip 39, a body chamfer 44 extending inwardly from distal outer lip 39, and a ledge 46 extending inwardly from the body chamfer 44. As mentioned above with reference to FIG. 3, the body 20 may include the axial passage 48. The second opening 38 may interface with (e.g., meet with, be in communication with, etc.) the axial passage 48, which may extend between the second opening 38 and a first opening 50 (described below with reference to FIG. 7B). Where the axial passage 48 interfaces with the second opening 38, the axial passage 48 may form a female fitting 42 defined by one or more annular depressions extending radially outward from an inner surface of the axial passage 48 relative to the longitudinal axis 70. Along the female fitting 42, the axial passage 48 may further form a pilot groove 40 extending parallel to the axis 70. As shown with reference to FIG. 7C, the second end 24 of the body 20 is shown in alternative embodiments of the apparatus 10, such as those depicted with reference to FIGS. 8C and 8D, as discussed in greater detail below.

Figure 8A:
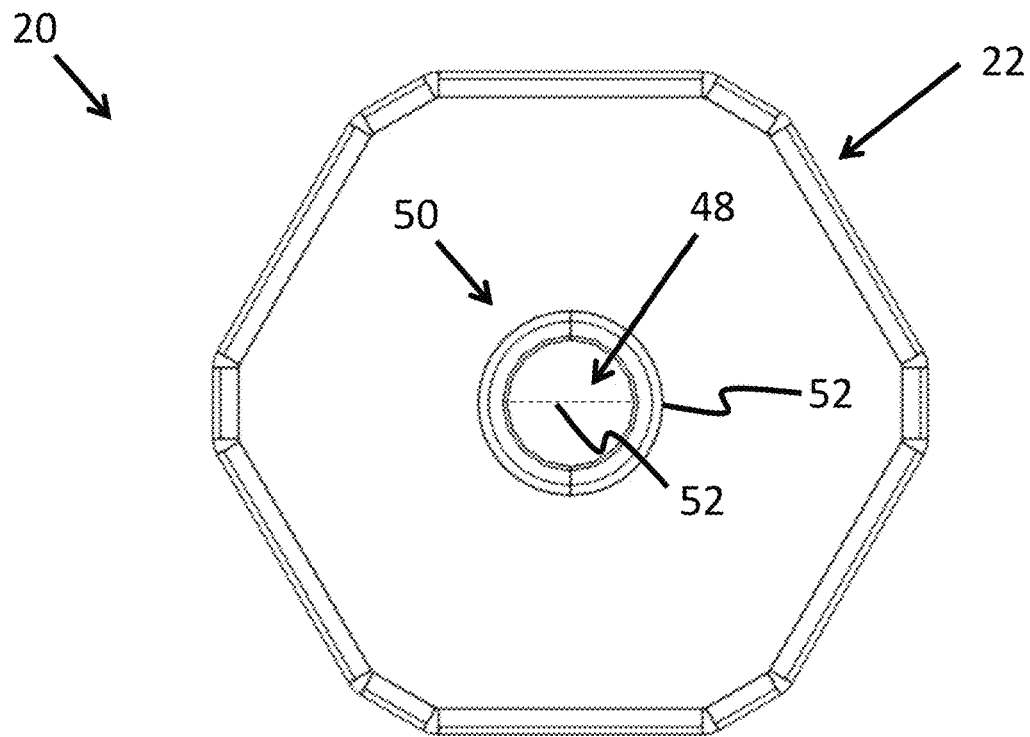
FIG. 8A is a front elevated view of an embodiment of a body for an animal training bumper apparatus in accordance with the present disclosure.
Figure 8B:
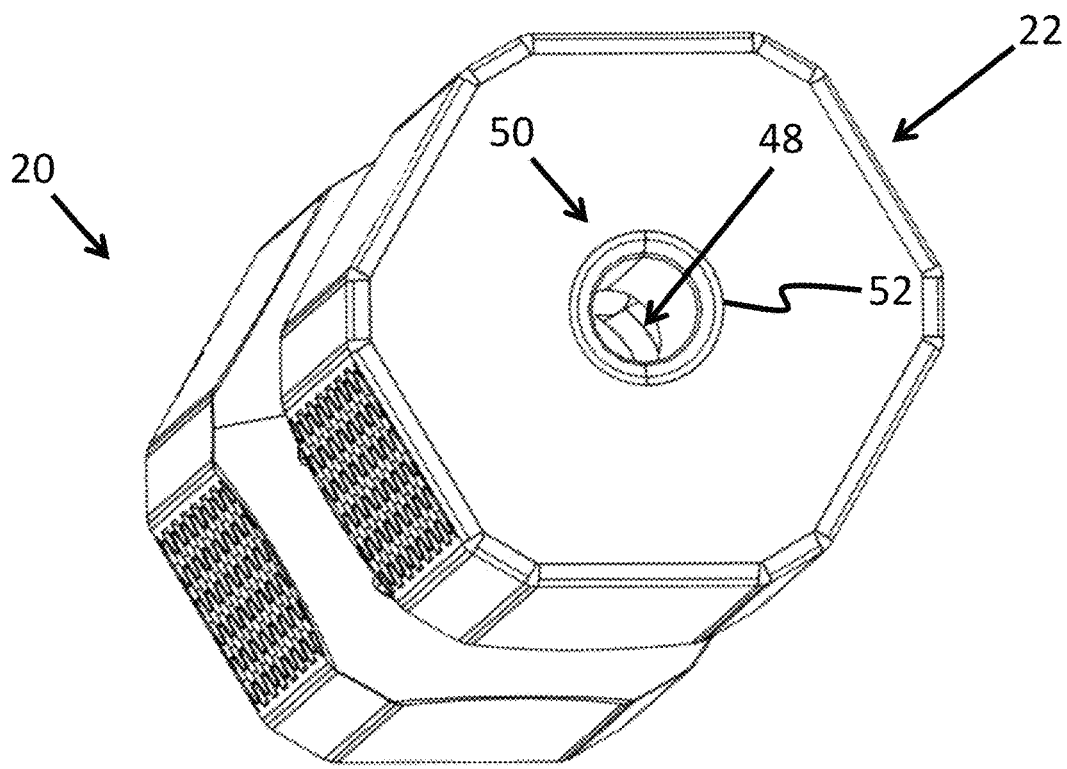
FIG. 8B is a front perspective view of an embodiment of a body for an animal training bumper apparatus in accordance with the present disclosure.

Referring now to FIGS. 8A and 8B, the first end 22 of the body 20 is shown in greater detail, according to some embodiments. The first end 22 may form a first opening 50. The first opening 50 may be provide outside access to the axial passage 48 via a hole 52. In other embodiments, the first opening 50 (or, more particularly, the hole 52) is formed as a slot, an aperture, or some other suitable opening.

In various embodiments, the hole 52 is wide enough such that the intermediate section 82 of the handle 80 is able to be movable relative to the first opening 50. In some embodiments, the first opening 50 (particularly the hole 52) has a diameter that is similar (e.g., equal, greater by five percent, ten percent, etc.) to the diameter of the intermediate section 82. This may allow for a secure throwing of the apparatus 10 that would otherwise not be afforded by the first opening 50 having a larger diameter. The diameter of the first opening 50 may thus be too small for clearance of the first end 88 of the handle 80. Thus, in some embodiments, the handle 80 may be guided into the first opening 50 but not movable throughout the entire axial passage 48 (due to the first end 88), and thus only removable from the first opening 50.

Figure 8C:
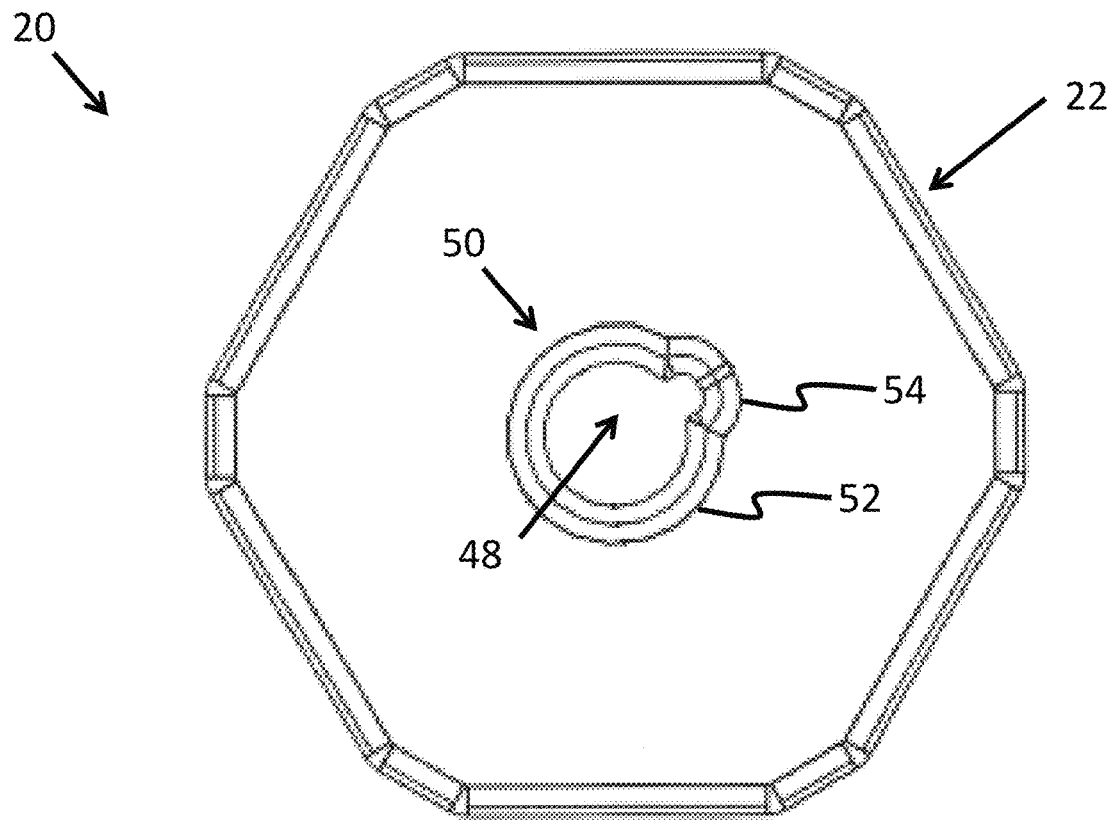
FIG. 8C is a front elevated view of an alternative embodiment of a body for an animal training bumper apparatus in accordance with the present disclosure.
Figure 8D:
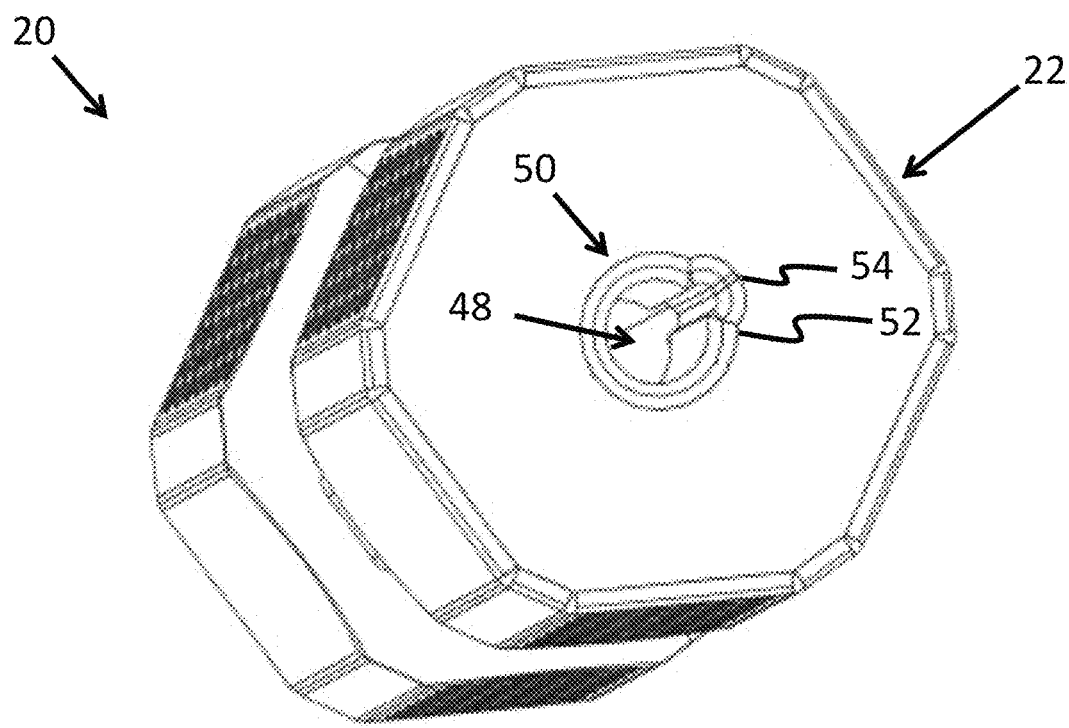
FIG. 8D is a front perspective view of an alternative embodiment of a body for an animal training bumper apparatus in accordance with the present disclosure.
Figure 9A:
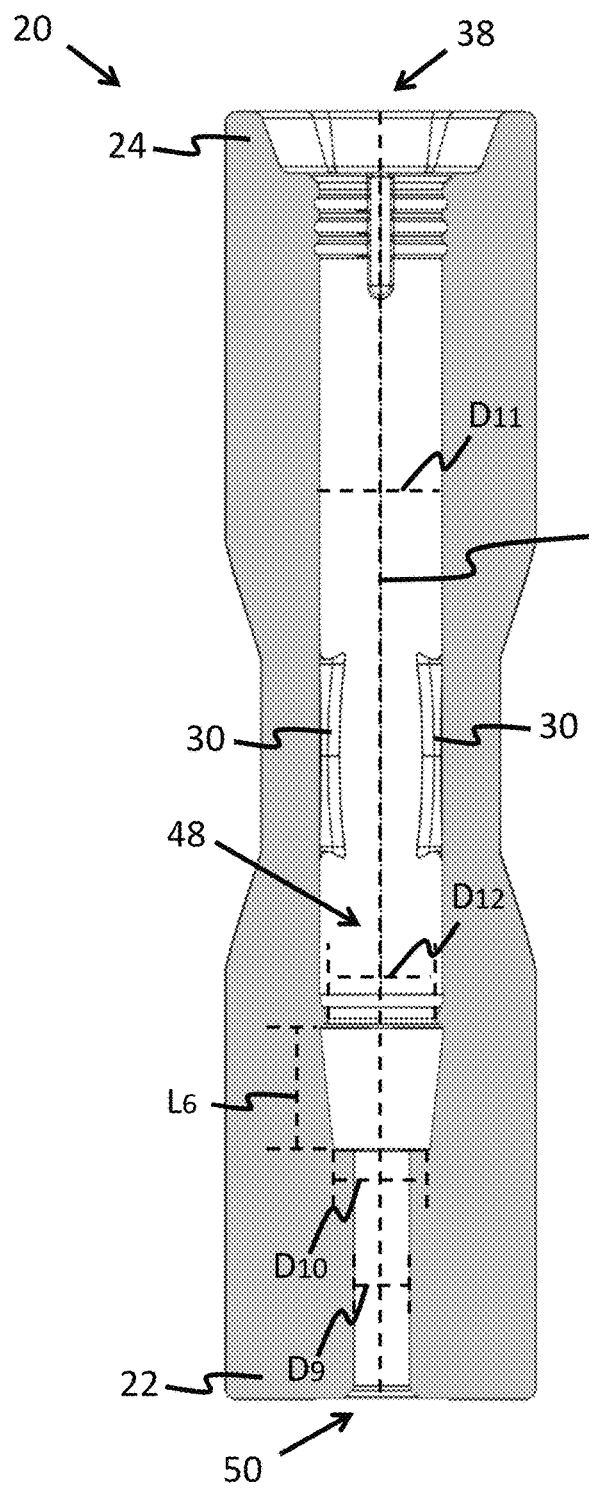
FIG. 9A is a cross-sectional view of an embodiment of a body for an animal training bumper apparatus in accordance with the present disclosure.
Figure 9B:
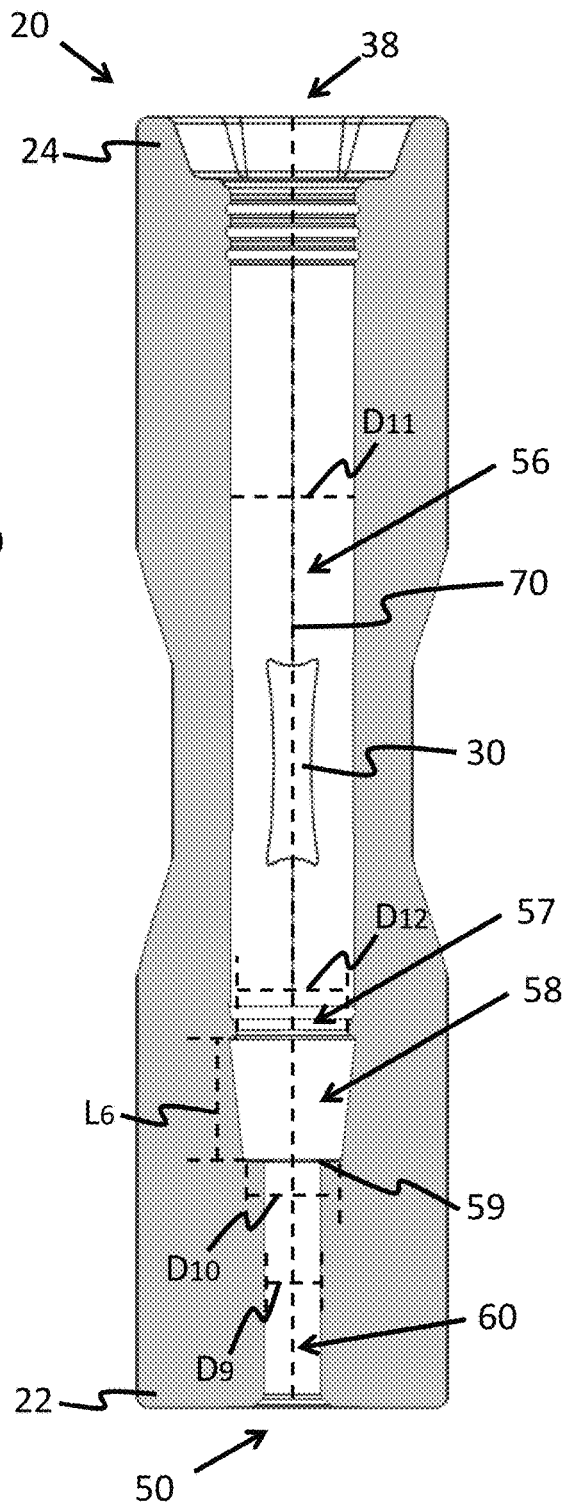
FIG. 9B is a side cross-sectional view of an embodiment of a body for an animal training bumper apparatus in accordance with the present disclosure.
Figure 10A:
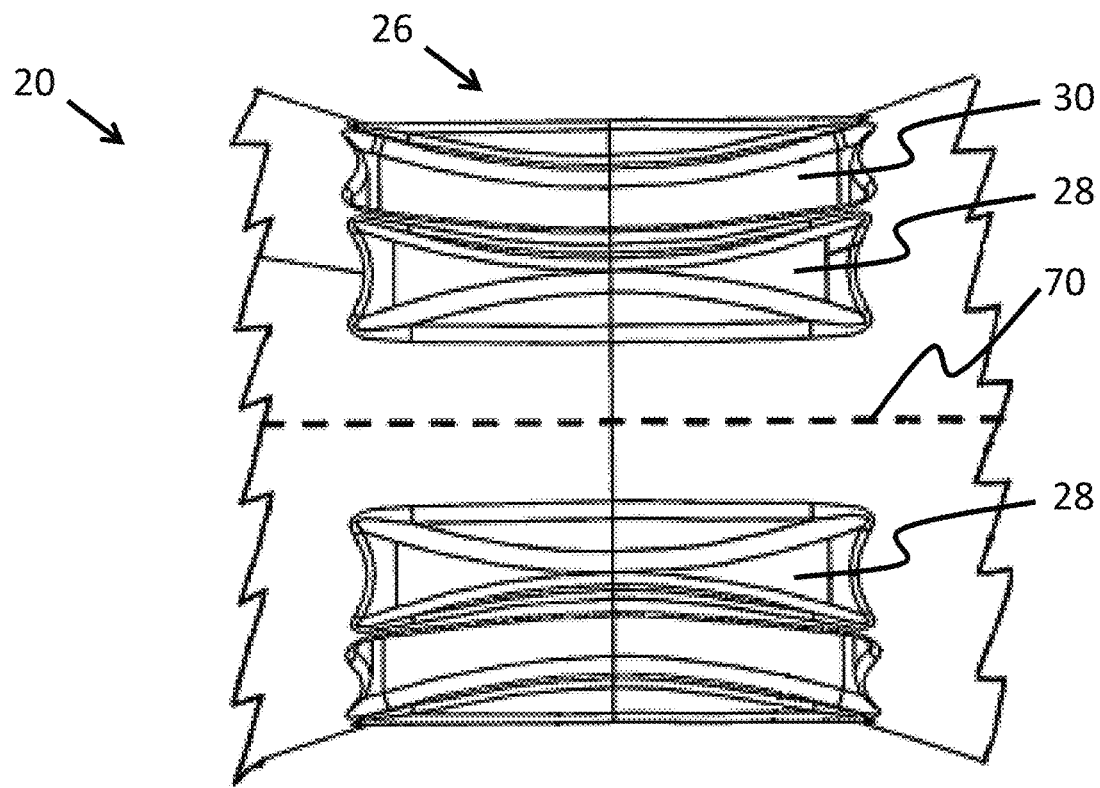
FIG. 10A is a side elevated view of an embodiment of a recessed region on a body for an animal training bumper apparatus in accordance with the present disclosure.
Figure 10B:
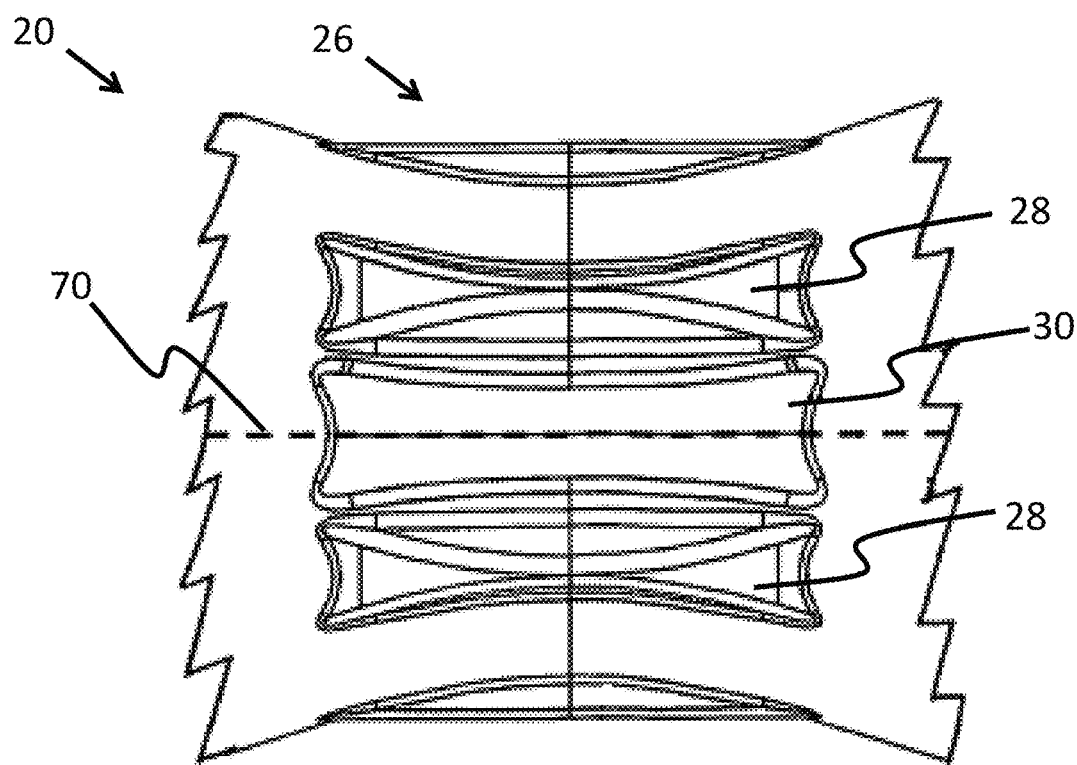
FIG. 10B is a side elevated view of an embodiment of a recessed region on a body for an animal training bumper apparatus in accordance with the present disclosure.
Figure 10C:
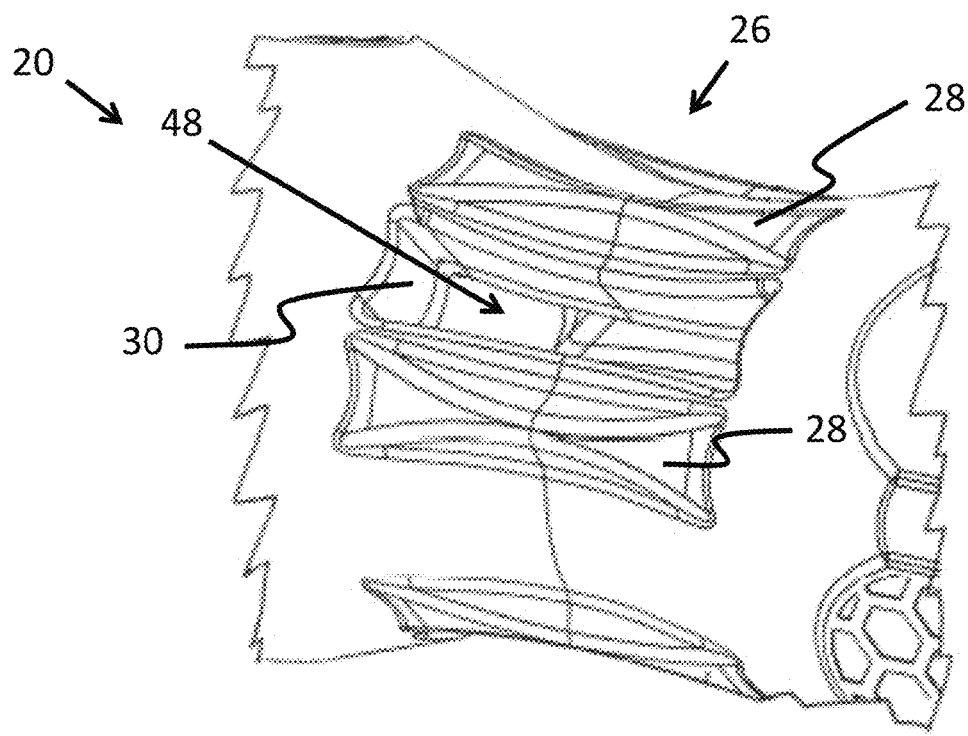
FIG. 10C is a perspective view of an embodiment of a recessed region on a body for an animal training bumper apparatus in accordance with the present disclosure.
Figure 10D:
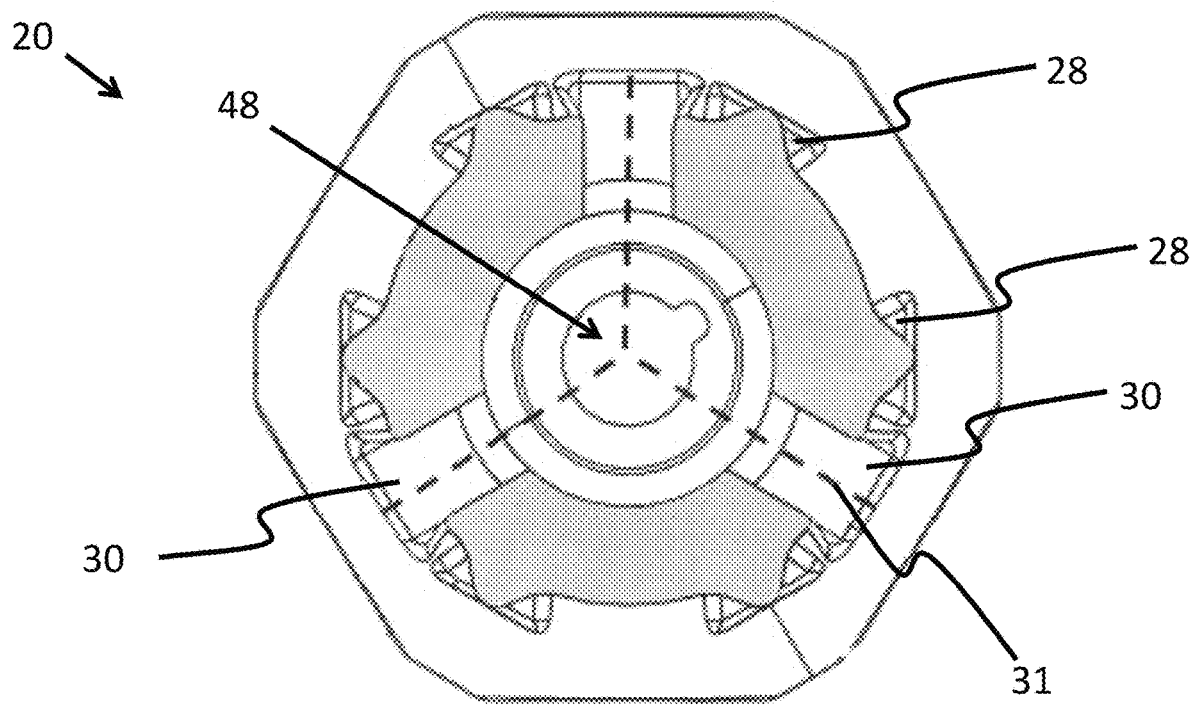
FIG. 10D is a top cross-sectional view of a body for an animal training bumper apparatus in accordance with the present disclosure.

As shown in FIGS. 8C-8D, in alternative embodiments of the apparatus 10, the first end 22 may further form an vent 54 extending from the hole 52. In such embodiments, the hole 52 is wide enough such that the intermediate section 82 of the handle 80 is able to be movable relative to the first opening 50. The vent 54 may allow for air to escape the first opening 50 when the hole 52 is substantially filled with the intermediate section 82 of the handle 80. In such situations, the vent 54 may prevent the formation of a vacuum seal between the hole 52 and the handle 80. In other words, the Referring now to FIGS. 9A and 9B, a cross section of the body 20 is shown, according to some embodiments. As suggested above, the body 20 includes the axial passage 48 extending between the first end 22 (and, in particular, the first opening 50 thereon) and the second end 24 (and, in particular, the second opening 38 thereon). In some embodiments, the axial passage 48 includes a first passage 60 and a second passage 56. The first passage 60 may have a first passage diameter $D_9$, while the second passage 56 may have a second passage Diameter $D_{11}$. In other words, the first passage diameter Do may be a diameter of the axial passage 48 at the first end 22 of the body 20, and the second passage diameter $D_{11}$ may be a diameter of the axial passage 48 at the second end 24 of the body 20. As shown in this exemplary embodiment, the second passage diameter $D_{11}$ may be greater than the first passage diameter $D_9$. The sleeve 100 may be disposed in the second passage 56.

In some embodiments, second passage 56 includes a taper section 58 on one end of the second passage 56. For instance, the taper section 58 of the second passage 56 may interface with the first passage 60. As shown in this exemplary embodiment, the taper section 58 may have a length defined by Le and a diameter that reduces from the main second passage diameter $D_{11}$ to a taper section diameter $D_{10}$. In other words, the taper section diameter $D_{10}$ may reduce towards the first passage 60.

In some embodiments, the taper section diameter $D_{10}$, while less than the second passage diameter $D_{11}$, is greater than the first passage diameter $D_9$. This may form a step 59 where the diameter of the axial passage 48 immediately (or substantially) reduces from $D_{10}$ to $D_9$ (e.g., the step 59 may be formed where the taper section 58 interfaces with the second passage 60). As discussed in greater detail below, the sleeve 100 may be received within the taper section 58.

In some embodiments, the axial passage 48 further includes a throat section 57 located where the second passage 56 meets the taper section 58. The throat section 57 may define a throat diameter $D_{12}$ that is slightly less than the second passage diameter $D_{11}$. As shown with reference to FIGS. 9C and 9D, in alternative embodiments of the apparatus 10, the body 20 may not include the throat section 57.

Referring now to FIGS. 10A-10D, the recessed region 26 mentioned above with reference to FIG. 6 is shown in greater detail, according to some embodiments. Advantageously, the recessed region 26 may encourage an animal to grasp the body 20 of the apparatus 10 in its midsection, as may be proper form when retrieving downed game. As shown, the recessed region 26 includes one or more ridges 28 and one or more apertures 30. The one or more ridges 28 may afford a tactile and/or durable surface in the recessed region 26 when an animal grasps the body 20 with its mouth.

In some embodiments, the one or more ridges 28 and/or the one or more apertures 30 are defined in an elongate fashion on the body 20, thus extending substantially parallel to the axis 70. In some embodiments, the one or more ridges 28 and/or the one or more apertures 30 are arranged in circumferentially spaced groupings. For example, as particularly shown with reference to FIG. 10D, a single aperture 30 is shown to be circumferentially situated between two ridges 28. Such arrangements of a single aperture 30 between two ridges 28 may be evenly spaced about the circumference of the recessed region 26. For example, as shown with particular reference to FIG. 10D, three such arrangements are shown disposed on the recessed region 26, thus providing three apertures 30 spaced circumferentially about the axis 70.

In some embodiments, the apertures 30 provide for an air channel into and through the axial passage 48. For example, and with particular reference to FIG. 10D, the one or more apertures 30 may form an air channel 31. Advantageously, when an animal grasps the body 20 in its mouth, particularly around the recessed region 26, the air channel 31 may form a respiratory passageway through which the animal can breathe, regardless of the particular rotational (e.g., about the axis 70) orientation that the animal grasps the body 20. In this sense, the three apertures 30 may thus define three such air channels 31 spaced circumferentially about the axis 70.

Figure 11A:
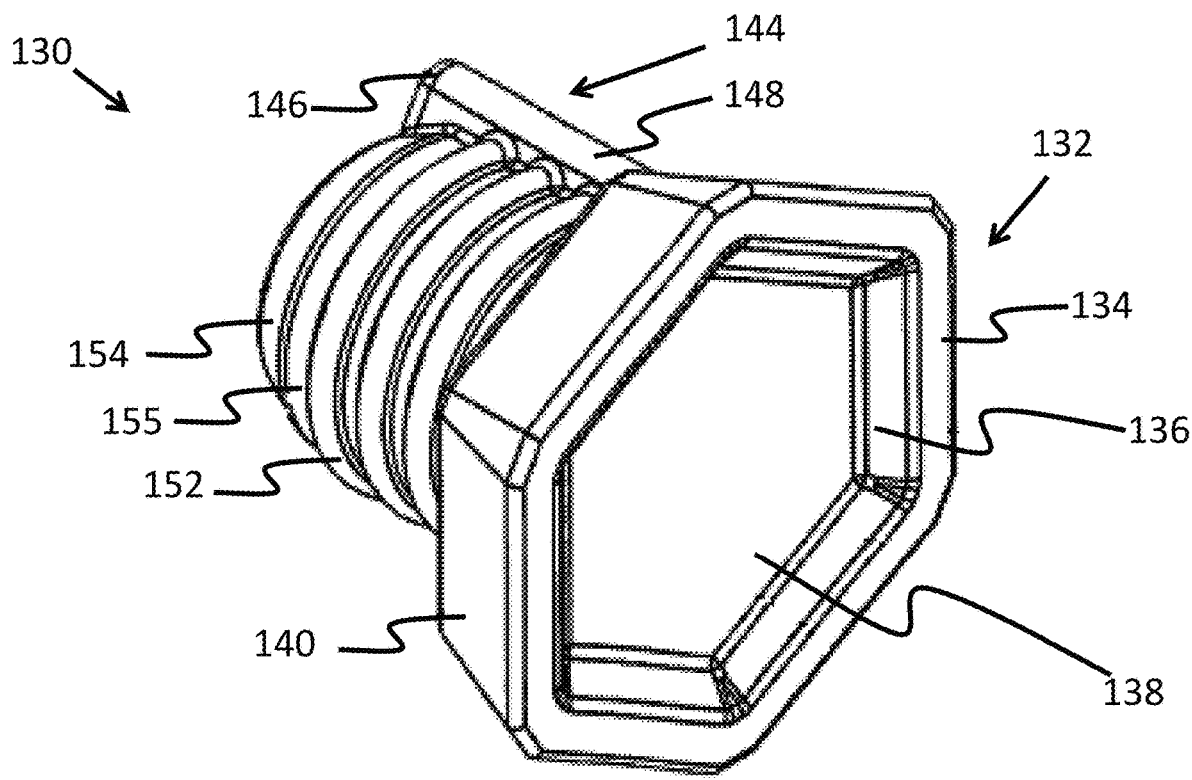
FIG. 11A is a front perspective view of an embodiment of a plug for an animal training bumper apparatus in accordance with the present disclosure.
Figure 11B:
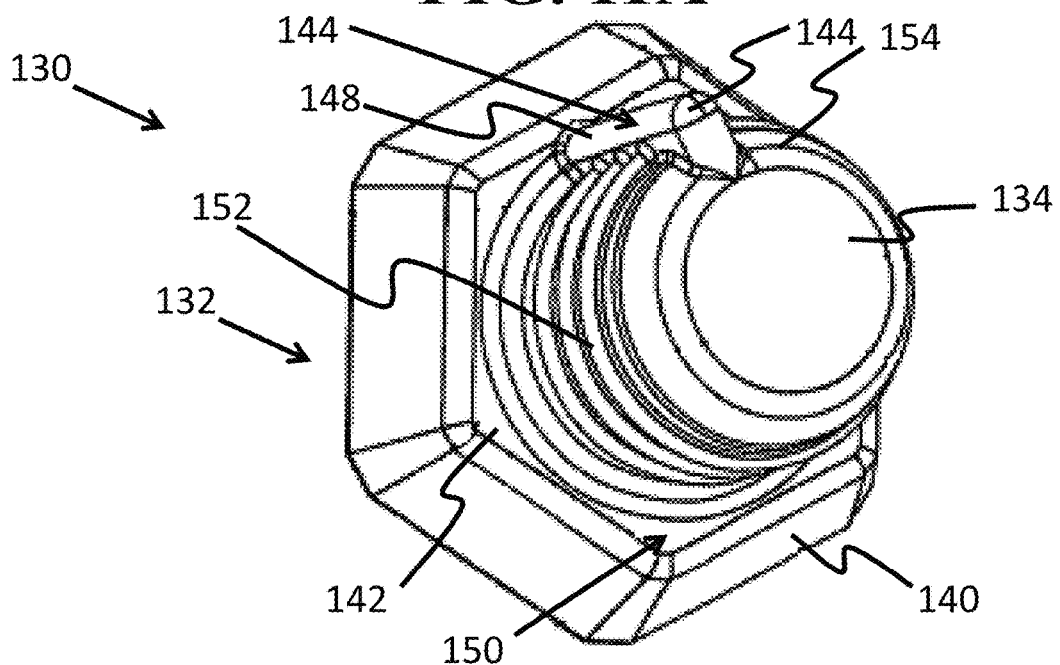
FIG. 11B is a rear perspective view of an embodiment of a plug for an animal training bumper apparatus in accordance with the present disclosure.
Figure 11C:
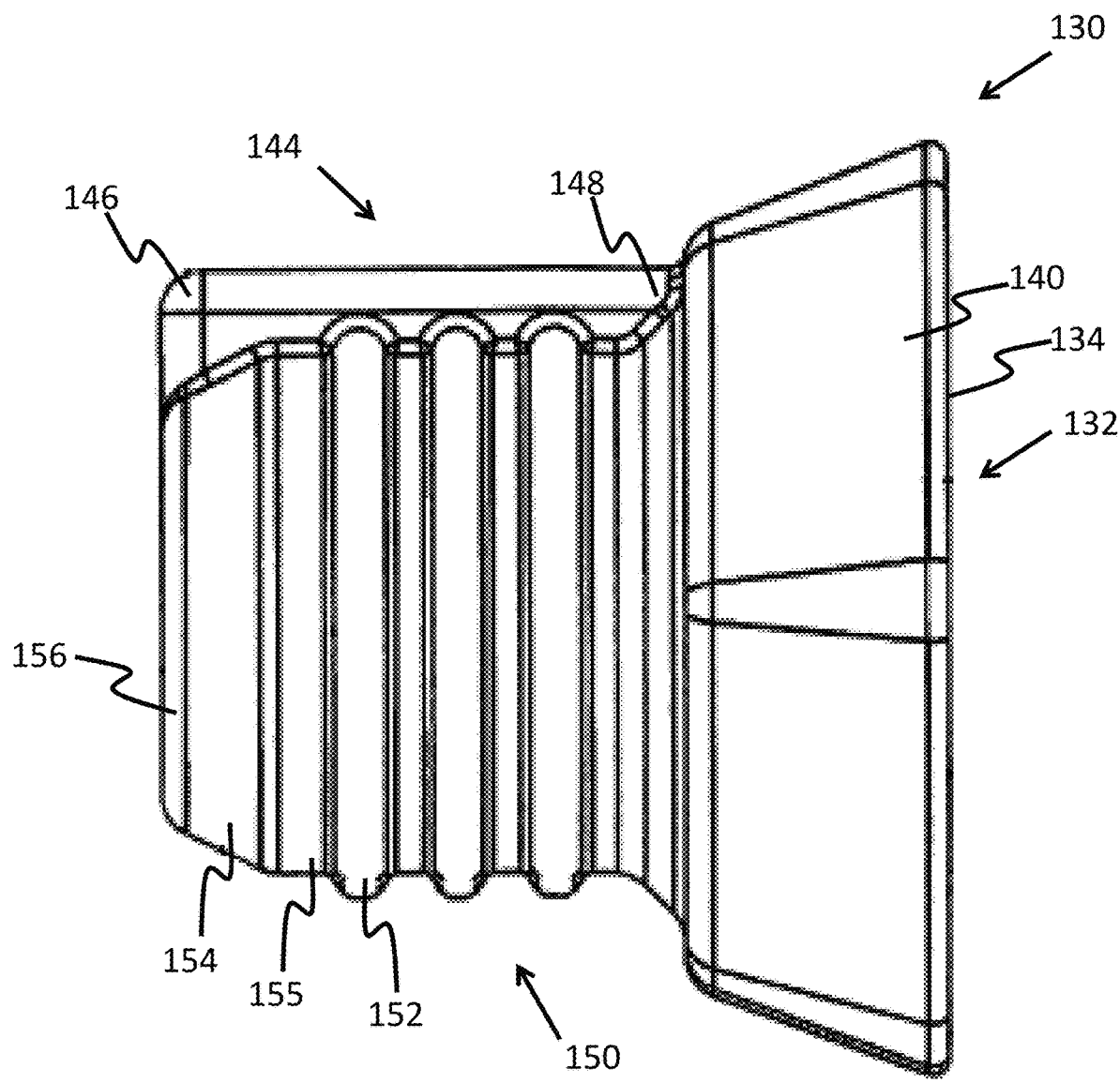
FIG. 11C is a side elevated view of an embodiment of a plug for an animal training bumper apparatus in accordance with the present disclosure.

Referring now to FIGS. 11A-11C, the plug 130 is shown, according to some embodiments. In some embodiments, the plug 30 is made from a material similar to the body 20 as discussed above. In other embodiments, the plug is made from another material including, but not limited to, nylon, plastic, and polycarbonate. In particular, a glass-filled nylon construction of the plug 130 may provide a hard material that discourages an animal from grasping the body 20 at its end, further encouraging the animal to grasp the body 20 towards its midsection as discussed above. The plug 130 may include a head portion 132 and an insert portion 150. For example, the head portion 132 may includes a lip 134, a plug chamfer 136 extending inwardly from the lip 136, a plug head top surface 138 within the plug chamfer 136, a plug head side surface 140, and a plug head bottom surface 142. The insert portion 150 may include a pilot bar 144, a male fitting 152, and a plug insert bottom surface 156. The pilot bar 144 may be defined by an elongate member that extends from a pilot bar top end 148 to a pilot bar bottom end 146 along the length of the insert portion 150 (e.g., parallel to the axis 70) and projects radially outward from an outer surface 155 of the insert portion 150. The male fitting 152 may be defined by one or more annular members projecting radially outward from the outer surface 155 of the insert portion 150.

Figure 12A:
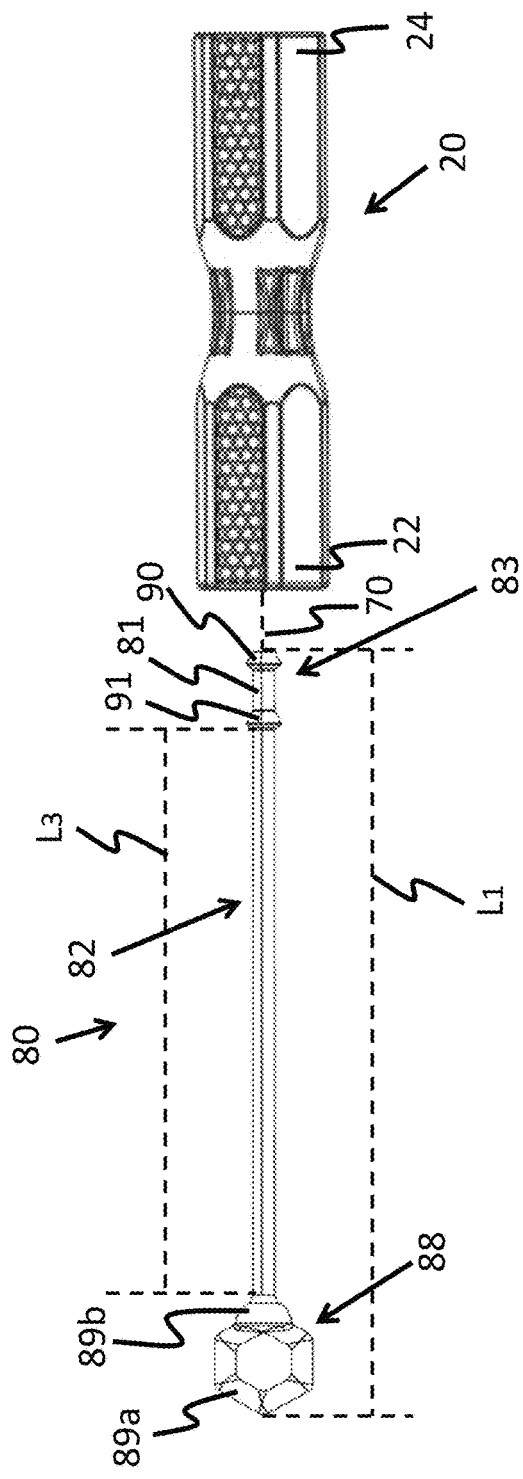
FIG. 12A is a schematic view of an embodiment of a first step for assembling an animal training bumper apparatus in accordance with the present disclosure.

Referring now to FIGS. 12A-12R, a method of assembling the apparatus 10 is shown, according to some embodiments. Referring particularly to FIG. 12A, a first step of assembling the apparatus 10 may include positioning the handle 80 with respect to the body 20 such that the knob 90 is aligned (via the axis 70, for example) with the first opening 50 (described above with reference to FIGS. 8A-8B) located about the first end 22 of the body 20.

Figure 12B:
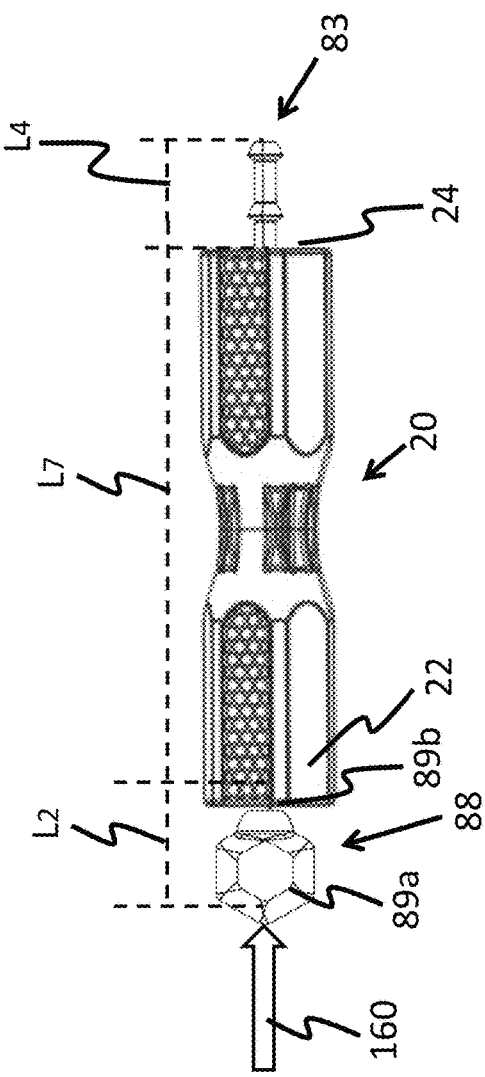
FIG. 12B is a schematic view of an embodiment of a second step for assembling an animal training bumper apparatus in accordance with the present disclosure.

Referring particularly to FIG. 12B, a second step of assembling the apparatus 10 may include inserting the handle 80 into the body 20 in a first direction 160, such that the handle 80 is disposed (at least partially) in the body 20. In other words, the second step may include advancing the handle 80 through the first opening 50 and through the axial passage 48 until the second end 89 of the handle 80 opposite the first end 88 of the handle 80 is advanced through the second opening 38. For example, the handle 80 may be guided into the axial passage 48 by moving the first and second knobs 90, 91 into the first opening 50 and guiding the first and second knobs 90, 91 through the axial passage 48 until the first and second knobs 90, 91 extended through and out of the second opening 38 of the body 20 (described above with reference to FIGS. 7A-7B). As shown, the handle 80 may be guided as such until the first and second knobs 90, 91 extend out of the second opening 38.

In this sense, the handle 80 may have a length that is greater than a length of the body 20. For example, as discussed above with reference to FIG. 4A, the entire length of the handle 80 may be defined as $L_1$, the length of the first end 88 (e.g., the loop 89, depending on the embodiment) may be defined as $L_2$, the length of the intermediate section 82 may be defined as $L_3$, and the length of the second end 83 may be defined as $L_4$. As shown, the entire length of the body 20 may be defined as $L_7$. Thus, $L_1$, may be greater than $L_7$. More particularly, $L_3$ may be equal to or greater than $L_7$. For example, when the handle 80 is guided into the axial passage 48 in the first direction 160 until the portion of the handle 80 remaining at a proximal position relative to the first end 22 is the first end 88 (e.g., $L_2$ remains proximal to the body 20), the first and second knobs 90, 91 may extend past the second end 24 of the body 20. In some embodiments, the first knob 90 may exceed the second end 24 of the body 20 by $L_4$. This may allow the handle 80 to be inserted into the sleeve 100, as described in greater detail below.

As shown with reference to FIGS. 12C and 12D, in alternative embodiments of the apparatus 10, such as those depicted with reference to FIGS. 1D-1F, the first knob 90 may exceed the second end 24 by a sum of $L_4$ (which is shorter in such alternative embodiments, due to the lack of the second knob 91) and $L_8$, which is a portion of $L_1$ that defines an exposed portion 85 of the midsection 82 that also exceeds the first end 22 when the handle 80 is positioned as shown. Thus, as shown with reference to FIGS. 12C and 12D, in alternative embodiments of the apparatus 10, such as those depicted with reference to FIGS. 1D-1F, the first and second steps may similarly be conducted.

Figure 12E:
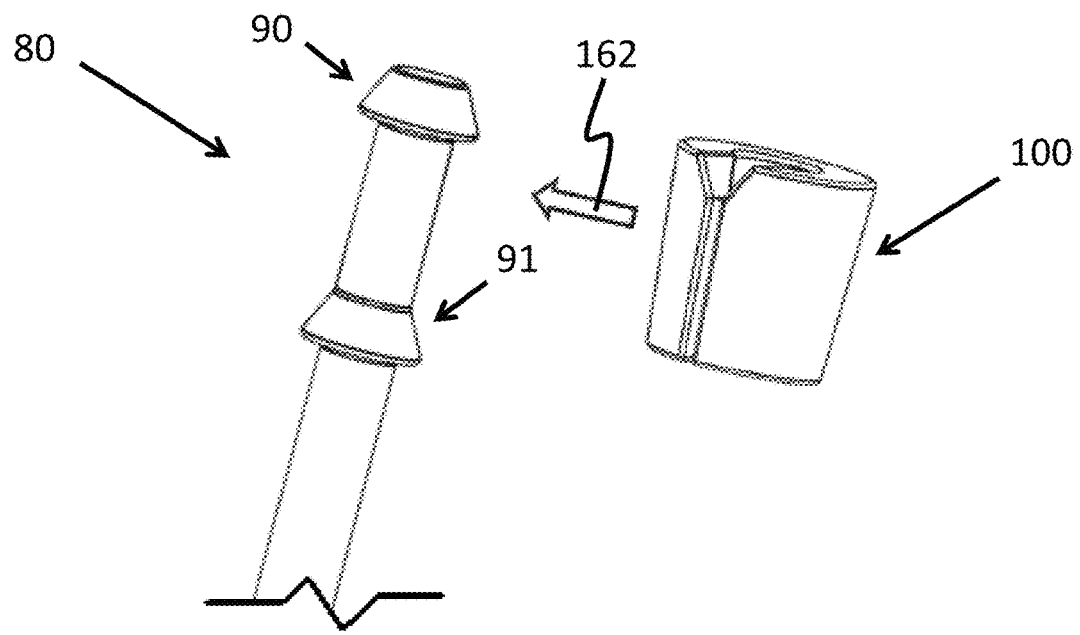
FIG. 12E is a schematic view of an embodiment of a third step for assembling an animal training bumper apparatus in accordance with the present disclosure.
Figure 12F:
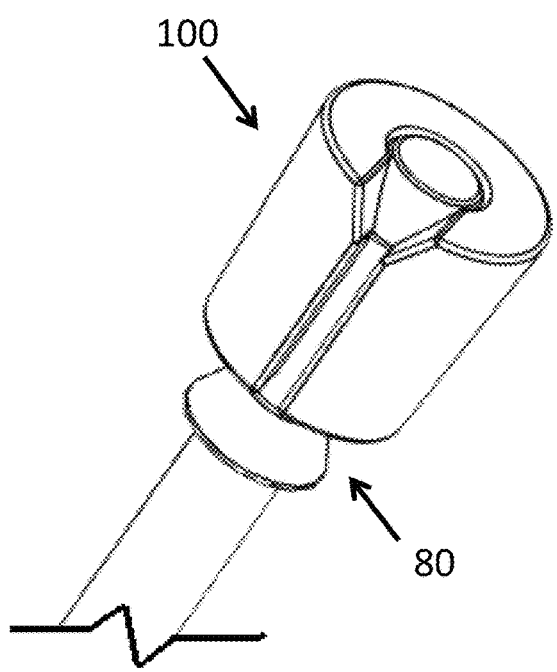
FIG. 12F is a perspective view of an embodiment of a third step for assembling an animal training bumper apparatus in accordance with the present disclosure.
Figure 12G:
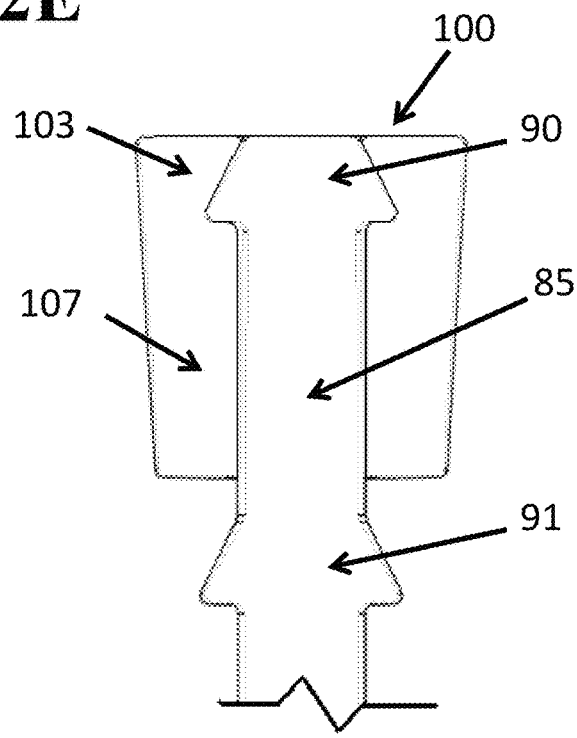
FIG. 12G is a cross-sectional view of an embodiment of a third step for assembling an animal training bumper apparatus in accordance with the present disclosure.
Figure 12H:
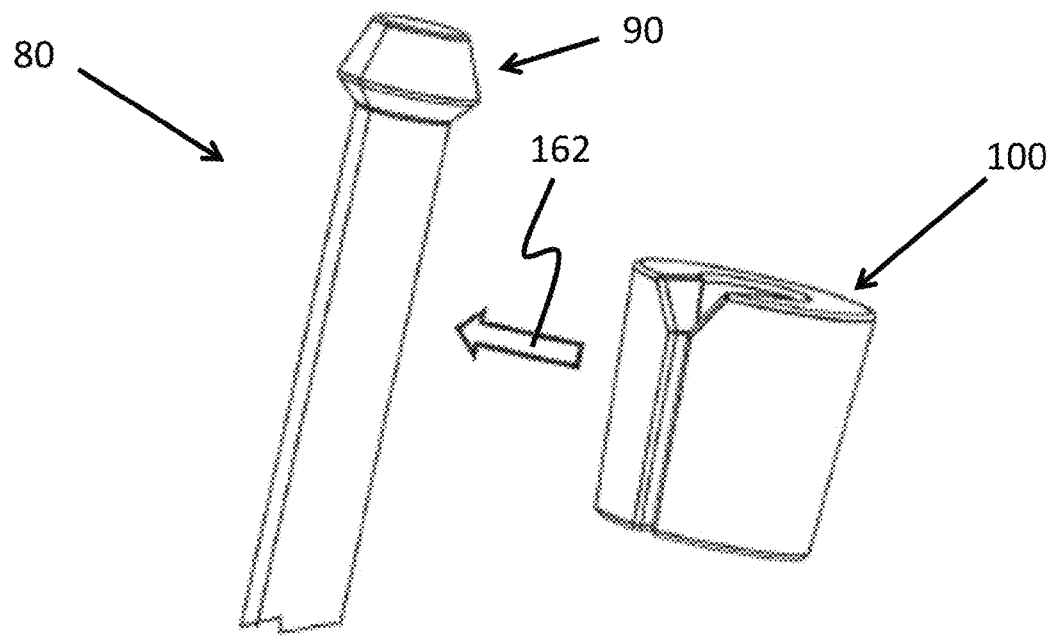
FIG. 12H is a schematic view of an alternative embodiment of a third step for assembling an animal training bumper apparatus in accordance with the present
Figures 12I, 12J:
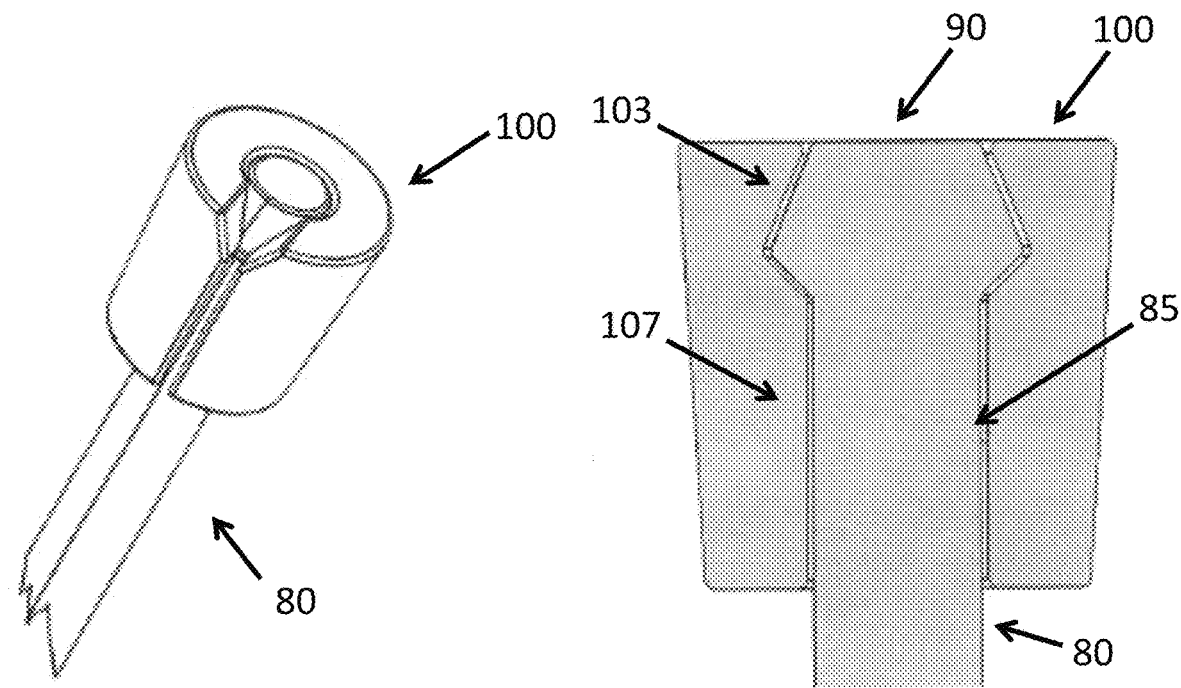
FIG. 12I is a perspective view of an alternative embodiment of a third step for assembling an animal training bumper apparatus in accordance with the present disclosure.
FIG. 12J is a cross-sectional view of an alternative embodiment of a third step for assembling an animal training bumper apparatus in accordance with the present disclosure.

Referring particularly to FIGS. 12E-12G and 12K-12L, a third step of assembling the apparatus 10 may include inserting the handle 80 into the sleeve 100. With particular reference to FIGS. 12E-12G, the handle 80 is shown being inserted into the sleeve 100, according to some embodiments. As shown above in regards to FIG. 12B and the second step of assembling the apparatus 10, the handle 80 may be disposed (at least partially) within the body 20. Thus, in some embodiments, the third step may include advancing the sleeve 100 in a direction 162 towards a portion of the handle 80 that extends out of the second opening 38 (e.g., the first or second knobs 90, 91) and securing the sleeve 100 to the handle 80. In some embodiments, and as shown, the first knob 90 and the end section 81 may be inserted into the sleeve cavity 110 of the sleeve 100 to establish a secure engagement between the first knob 90 of the handle and the sleeve 100. For example, the sleeve 100 may be pressed onto the handle 80 such that the elongate opening straight region 113 engages the end section 81, and the elongate opening chamfer region 104 engages some or all of the first knob 90. In other embodiments, the second knob 91 and a portion of the intermediate section 82 that is similar in length to the end section 81 may be similarly inserted into the sleeve cavity 110. Accordingly, the sleeve 100 may be secured to the handle 80 at multiple locations (e.g., at the first or the second knobs 90, 91). As described in greater detail below with reference to FIGS. 12M and 12N), this may provide for multiple lengths of the handle 80 that may be free of the body 20 when the apparatus 10 is thrown. As shown with reference to FIGS. 12H-12J and 12M-12N, in alternative embodiments of the apparatus 10, the third step may be similarly completed, albeit with only first knob 90.

As mentioned above with reference to FIGS. 5A-5E, the sleeve 100 may include a slot 112 through which the first knob 90 and the end section 81, or the second knob 91 and the intermediate section 82, may travel in order to insert the handle 80 into the sleeve 100. In some embodiments, $T_1$ and/or $T_2$ (discussed above with reference to FIG. 5D) are less than of $D_1$ and/or $D_2$ (discussed above with reference to FIG. 4C), respectively. Accordingly, the sleeve 100 and/or the first or second knobs 90, 91, depending on the embodiment, may slightly deflect in order to insert the first or second knobs 90, 91 into the sleeve 100 as shown with particular reference to FIGS. 12F and 12G. In other words, the sleeve 100 may be secured to the handle 80 in a "press-fit" fashion.

With particular reference to FIGS. 12K and 12L, the body 20, handle 80, and sleeve 100 are shown assembled in accordance with the third step of assembling the apparatus 10 as described above. As shown with reference to FIGS. 12M and 12N, the alternative embodiment depicted with reference to FIGS. 1D-1F is shown similarly assembled. As mentioned above with reference to FIGS. 4C and 5E, the first and second knobs 90, 91 may each include the first angled knob surface 96 and the second angled knob surface 94, while the sleeve 100 may include the first angled sleeve surface 108 and the second angled sleeve surface 106. As particularly shown with reference to FIG. 5E, the first angled sleeve surface 108 corresponds to the first angled knob surface 96, and the second angled sleeve surface 106 corresponds to the second angled knob surface 94. Due to the opposing angles formed by the engagements between the aforementioned surfaces, the first or second knobs 90, 91 may be used to both push and pull the sleeve 100 along with the first or second knobs 90, 91 forward and backward.

Figure 12O:
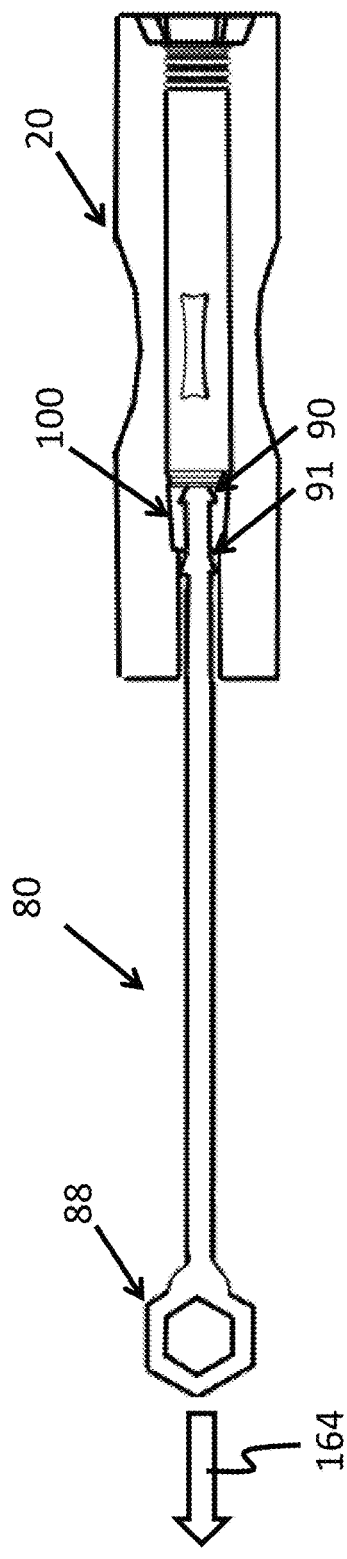
FIG. 12O is a schematic view of an embodiment of a fourth step for assembling an animal training bumper apparatus in accordance with the present
Figure 12P:
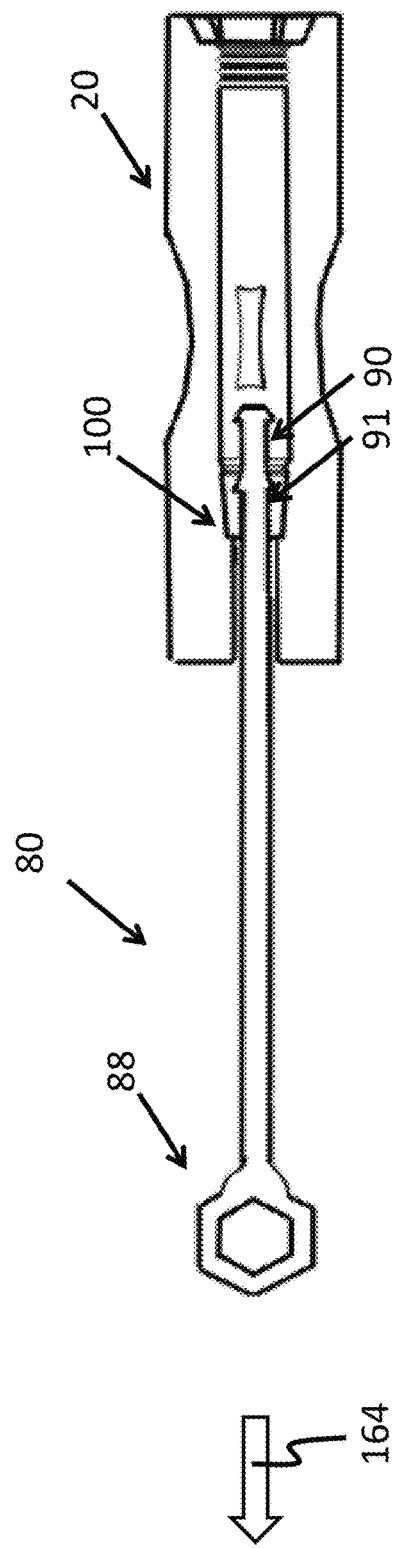
FIG. 12P is a schematic view of an embodiment of a fourth step for assembling an animal training bumper apparatus in accordance with the present disclosure.

As shown with reference to FIGS. 12O-12P, a fourth step of assembling the apparatus 10 may include retreating the handle 80, now disposed within the sleeve 100 (by inserting the knob 90 into the sleeve 100 as described above), in a third direction 164, such that the knob 90 and/or the sleeve 100 move through the axial passage 48 toward the first end 22 of the body 20. The sleeve 100 may be pulled through the axial passage 48 of the body 20 in order to come to a resting point within the taper section 58 of the axial passage 48. Additionally, the sleeve 100 may be required to be pushed through the axial passage 48 of the body 20 in order to extend the sleeve 100 out of the second opening 38 to remove the sleeve 100 from the handle 80, allowing the handle 80 to then be drawn through the first opening 50 for disassembly of the apparatus 10. Thus, the aforementioned angular surfaces and their corresponding engagements may advantageously provide a secure engagement that affords proper maneuverability of the sleeve 100 within the axial passage 48.

Figure 12Q:
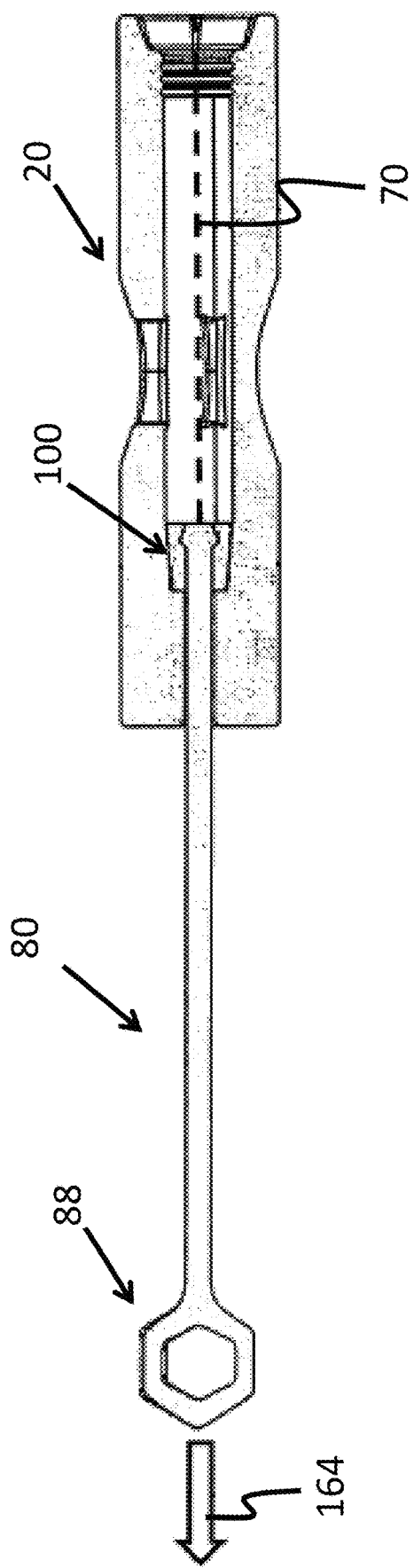
FIG. 12Q is a schematic view of an alternative embodiment of a fourth step for assembling an animal training bumper apparatus in accordance with the present disclosure.

In some embodiments, the first and second knobs 90, 91, along with the sleeve 100, may move through the axial passage 48 until they come to rest within the taper section 58. For example, the first sleeve end 101 (described above with reference to FIGS. 5A-5E) may come to rest against the step 59, and the outer sleeve surface 114 may reach a snug fit against the inner taper surface 61. In other words, the corresponding tapers formed by the outer sleeve surface 114 and the inner taper surface 61 may result in some degree of a compressive force applied by the inner taper surface 61 on the outer sleeve surface 114, thus holding the sleeve 100 (and the knob 90 inserted therein) in place when the sleeve 100 is fully seated (e.g., retained) within the taper section 58 as shown. Further, and as mentioned above with reference to FIGS. 9A-9B, the axial passage 48 may include the throat section 57, which may feature a slightly reduced diameter. Accordingly, when the sleeve 100 is pulled through the axial passage 48 to come to rest within the taper section 58, the sleeve 100 may be slightly deflected in order to travel through the throat section 57. Once past the throat section 57, the reduced diameter of the throat section 57 may further act to retain the sleeve 100 within the taper section 58. As shown with reference to FIG. 12Q, the alternative embodiment depicted with reference to FIGS. 1D-1F (which may not include the throat section 57) is shown similarly assembled.

Referring now to FIGS. 12R-12S, an optional fourth step of assembling the apparatus 10 may include inserting a scented object 170 into the axial passage 48. In some embodiments, the scented object 170 is a game feather. In other embodiments, the scented object is some other natural or synthetic material that gives off a smell that mimics that of wild game. As shown, once inserted into the axial passage 48, the one or more apertures 30 may allow for the odor of the scented object 170 to escape the body 20 and thus be detectable by the animal. In this sense, the one or more apertures 30 on the recessed region 26 serve a double purpose: animal respiration and scent. This step may similarly be completed for the alternative embodiment of the apparatus 10 depicted with reference to FIGS. 1D-1E.

Figure 12T:
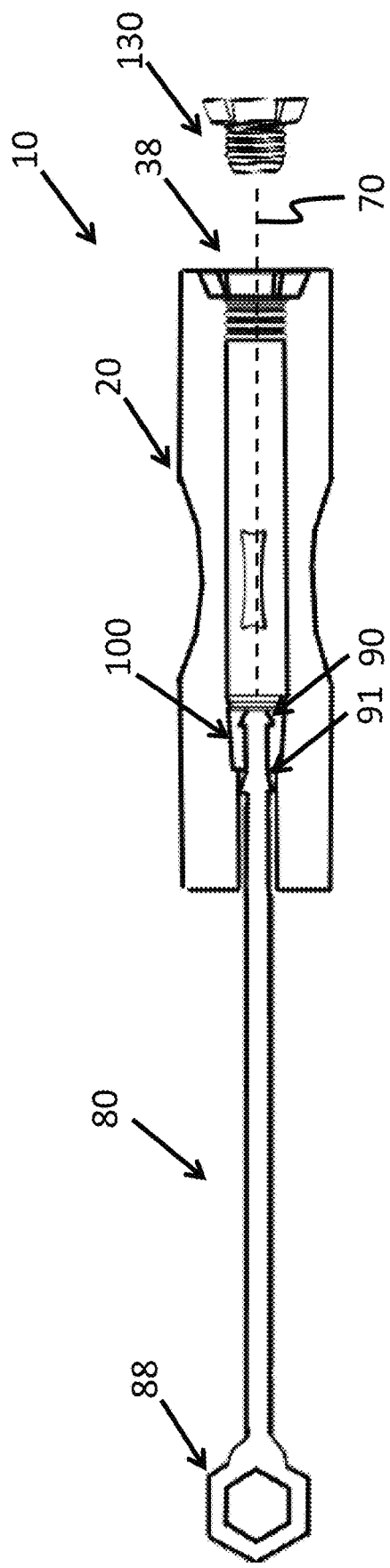
FIG. 12T is a cross-sectional view of an embodiment of a sixth step for assembling an animal training bumper apparatus in accordance with the present disclosure.
Figure 12U:
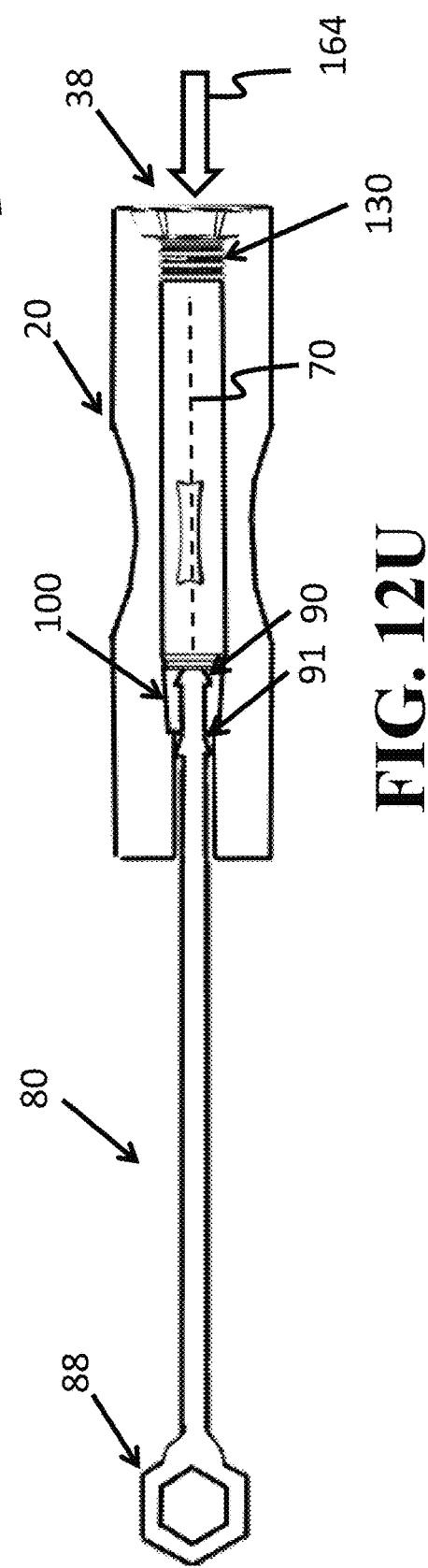
FIG. 12U is a cross-sectional view of an embodiment of a sixth step for assembling an animal training bumper apparatus in accordance with the present disclosure.

Referring now to FIGS. 12T-12U, a fifth step of assembling the apparatus 10 (or a fourth step, in embodiments that do not include the insertion of the scented object as described above with reference to FIGS. 12R-12S) may include inserting the plug into the second opening 38 of the body 20. As described above with reference to FIGS. 11A-11C, the plug 130 includes the pilot bar 144 and the male fitting 152. As described above with reference to FIGS. 7A-7B, the axial passage 48 includes the female fitting 42 and the pilot groove 40. The pilot bar 144 and the male fitting 152 may be received by the pilot guide 40 and the female fitting 42, respectively. For example, the one or more annular ribs formed by the male fitting 152 may correspond to the one or more annular depressions formed by the female fitting 42, thus holding the plug 130 within the second opening 38 once inserted. Moreover, the pilot bar 144 may correspond to the pilot guide 40, thus holding the plug 130 at a particular rotational position (relative to the axis 70) once inserted into the second opening 38. This step may similarly be completed for the alternative embodiment of the apparatus 10 depicted with reference to FIGS. 1D-1E.

Figure 13:
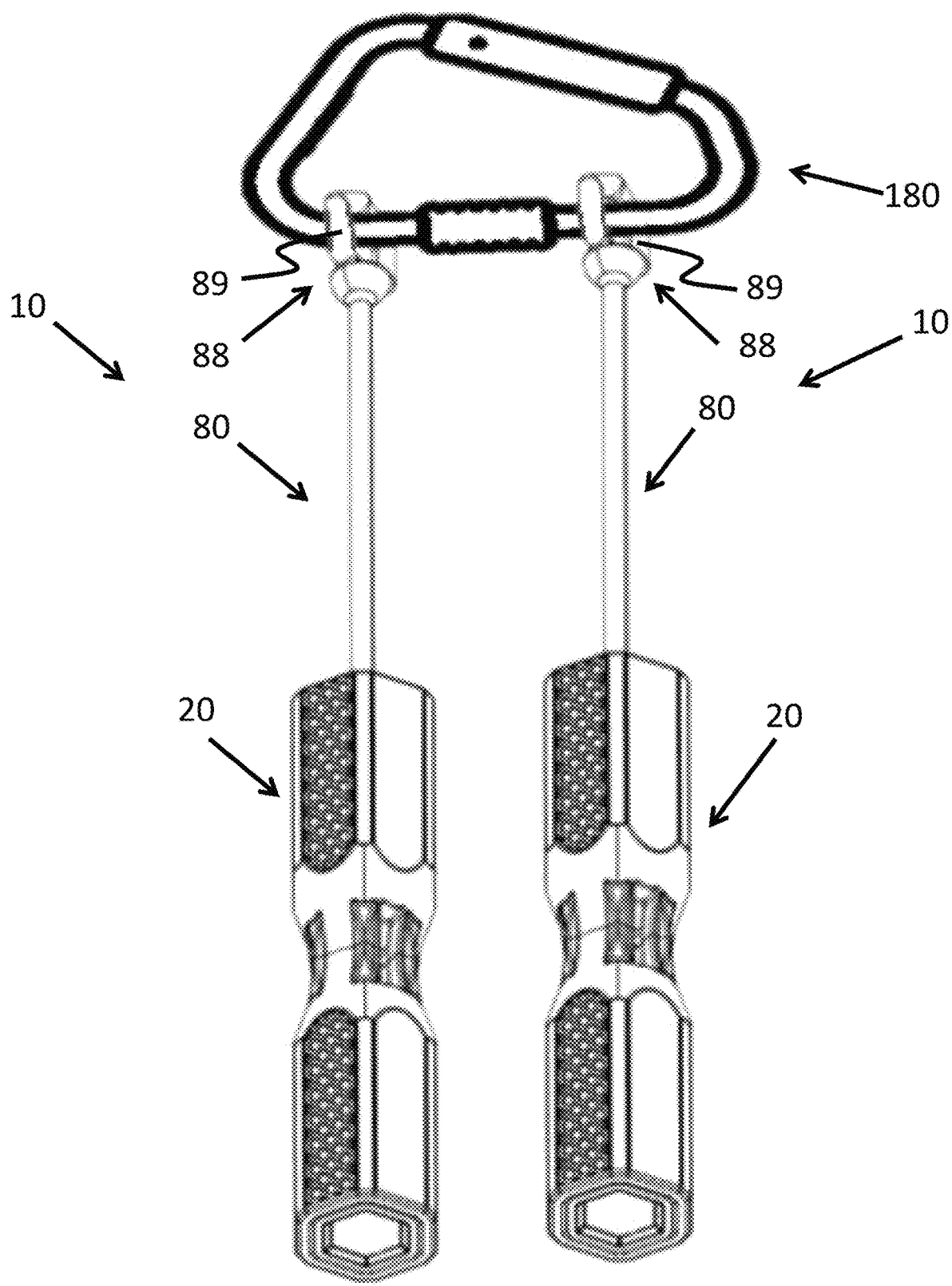
FIG. 13 is a perspective view of an embodiment of multiple animal training bumper apparatuses assembled on a carabineer in accordance with the present

Referring now to FIG. 13, multiple apparatuses 10 are shown assembled on a carabineer (or some other storage member) 180. Each of the apparatuses 10 may be disposed on the carabineer 180 via the loop 89.

Thus, although there have been described particular embodiments of the present invention of a new and useful ANIMAL TRAINING BUMPER, it is not intended that such references be construed as limitations upon the scope of this invention.

What is claimed is:

1. An animal training bumper apparatus, comprising:
   a body with an axial passage extending between a first opening on a first end of the body and a second opening on a second end of the body opposite the first end, the axial passage defining a first passage on the first side of the body and a second passage on the second side of the body; and
   a sleeve disposed in the second passage; and a handle disposed on the sleeve,
   wherein the first passage has a first passage diameter,
   wherein the second passage has a second passage diameter that is greater than the first passage diameter,
   wherein the sleeve has an outer sleeve diameter that is greater than the first passage diameter,
   wherein the handle is removable from the axial passage via the first opening,
   wherein the handle is only removable from the axial passage upon removing the handle from the sleeve, and
   wherein the handle is only removable from the sleeve upon advancing the sleeve through the second opening.

2. The apparatus of claim 1, wherein the second passage includes a taper section that interfaces with the first passage,
   wherein the taper section has a taper section diameter that reduces towards the first passage.

3. The apparatus of claim 1, wherein the sleeve is received within the taper section.

4. The apparatus of claim 1, further comprising a plug disposed in the second opening.

5. The apparatus of claim 1, wherein the handle includes a first knob configured to be received by the sleeve.

6. The apparatus of claim 5, wherein the handle includes a second knob configured to be received by the sleeve.

* * * * *